(12) United States Patent
Liu et al.

(10) Patent No.: US 12,199,507 B2
(45) Date of Patent: Jan. 14, 2025

(54) MULTI-PHASE SWITCHING CONVERTER AND CONTROL METHOD THEREOF

(71) Applicant: Richtek Technology Corporation, Hsinchu (TW)

(72) Inventors: Kuo-Chi Liu, Hsinchu (TW); Ta-Yung Yang, Taoyuan (TW)

(73) Assignee: Richtek Technology Corporation, Hsinchu (TW)

( * ) Notice: Subject to any disclaimer, the term of this patent is extended or adjusted under 35 U.S.C. 154(b) by 0 days.

(21) Appl. No.: 18/525,865

(22) Filed: Dec. 1, 2023

(65) Prior Publication Data

US 2024/0297580 A1 Sep. 5, 2024

Related U.S. Application Data

(60) Provisional application No. 63/487,881, filed on Mar. 1, 2023.

(30) Foreign Application Priority Data

Aug. 29, 2023 (TW) .................................. 112132649

(51) Int. Cl.
*H02M 3/07* (2006.01)
*H02M 1/00* (2006.01)

(52) U.S. Cl.
CPC ........... *H02M 3/07* (2013.01); *H02M 1/0009* (2021.05)

(58) Field of Classification Search
CPC ...... H02M 3/07; H02M 1/0009; H02M 3/015; H02M 1/0095; H02M 1/10; H02M 1/0058; H02M 3/158; H02M 3/1584; H02M 1/088; H02M 3/1586; H02M 3/01; Y02B 70/10
See application file for complete search history.

(56) References Cited

U.S. PATENT DOCUMENTS

| | | | | |
|---|---|---|---|---|
| 8,351,228 | B2 * | 1/2013 | Izumi | H02M 3/07 363/60 |
| 9,667,139 | B2 * | 5/2017 | Giuliano | H02M 3/158 |
| 9,917,517 | B1 * | 3/2018 | Jiang | H02M 1/34 |
| 10,063,146 | B1 * | 8/2018 | Lee | G01R 19/003 |

(Continued)

*Primary Examiner* — Yusef A Ahmed
(74) *Attorney, Agent, or Firm* — Huan-Yi Lin

(57) ABSTRACT

A multi-phase switching converter includes: first and second sub-switching converters; switching signals operating first and second capacitors of the first and second sub-switching converters to respectively perform a switched capacitor switching on a first voltage between plural electrical connection states, to respectively switch a first and second switching nodes between a first and second divided voltages of the first voltage obtained from the switched capacitor switching and a first and second reference voltage potentials thereby performing the power conversion between a first and second power nodes. Each of a first and second switch circuits of the first and second sub-switching converters has corresponding plural first and second switches and corresponding first and second subsidiary switch. Each of the first and second subsidiary switch is coupled between the first and second capacitors and the first and second switching nodes, to respectively decide whether the first and second capacitor is electrically connected to a first and second inductor according to the switching signal corresponding to the first and second subsidiary switch, respectively.

28 Claims, 25 Drawing Sheets

(56) References Cited

U.S. PATENT DOCUMENTS

| | | | | |
|---|---|---|---|---|
| 10,651,731 B1* | 5/2020 | Rainer | | H02M 3/1588 |
| 11,165,335 B2* | 11/2021 | Sblano | | H02M 3/1584 |
| 2002/0054499 A1* | 5/2002 | Tanaka | | H02M 7/4826 |
| | | | | 363/132 |
| 2004/0201281 A1* | 10/2004 | Ma | | H02M 3/158 |
| | | | | 307/38 |
| 2011/0031951 A1* | 2/2011 | Chen | | H02M 3/1582 |
| | | | | 323/288 |
| 2011/0175591 A1* | 7/2011 | Cuk | | H02M 3/158 |
| | | | | 323/311 |
| 2012/0139522 A1* | 6/2012 | Hasegawa | | H02M 1/32 |
| | | | | 323/311 |
| 2016/0181920 A1* | 6/2016 | Dai | | H02M 1/14 |
| | | | | 323/271 |
| 2019/0028025 A1* | 1/2019 | Babazadeh | | H01L 27/088 |
| 2020/0177081 A1* | 6/2020 | Huang | | H02M 3/07 |
| 2020/0204071 A1* | 6/2020 | Huang | | H02M 3/07 |
| 2021/0083582 A1* | 3/2021 | Bhattad | | H02M 3/158 |
| 2021/0328507 A1* | 10/2021 | Liu | | H02M 1/0095 |
| 2021/0351695 A1* | 11/2021 | Liu | | H02M 3/155 |
| 2021/0367511 A1* | 11/2021 | Liu | | H02M 3/01 |
| 2021/0367520 A1* | 11/2021 | Liu | | H02M 3/158 |
| 2021/0376717 A1* | 12/2021 | Liu | | H02M 3/01 |
| 2021/0384820 A1* | 12/2021 | Liu | | H02M 1/007 |
| 2021/0399621 A1* | 12/2021 | Liu | | H02M 3/01 |
| 2022/0006376 A1 | 1/2022 | Lu et al. | | |
| 2022/0029531 A1* | 1/2022 | Liu | | H02M 3/01 |
| 2022/0103066 A1* | 3/2022 | Chen | | H02M 3/04 |
| 2022/0140726 A1* | 5/2022 | Liu | | H02M 1/0095 |
| | | | | 323/271 |
| 2022/0352816 A1* | 11/2022 | Liu | | H02M 3/07 |
| 2022/0368218 A1* | 11/2022 | Liu | | H02M 3/01 |
| 2023/0028873 A1* | 1/2023 | Liu | | H02M 3/07 |
| 2023/0170795 A1* | 6/2023 | Yoo | | H02M 1/08 |
| | | | | 323/271 |
| 2023/0179093 A1* | 6/2023 | Liu | | H02M 1/0009 |
| | | | | 323/271 |
| 2023/0198404 A1* | 6/2023 | Cheng | | H02M 1/0025 |
| | | | | 323/271 |
| 2023/0223843 A1* | 7/2023 | Liu | | H02M 1/083 |
| | | | | 363/21.02 |
| 2023/0246548 A1* | 8/2023 | Liu | | H02M 3/07 |
| | | | | 323/271 |
| 2023/0318460 A1* | 10/2023 | Cheng | | H02M 1/0043 |
| | | | | 323/272 |
| 2023/0361674 A1* | 11/2023 | Liu | | H02M 1/0009 |
| 2023/0396162 A1* | 12/2023 | Liu | | H02M 1/0009 |
| 2023/0412073 A1* | 12/2023 | Ge | | H02M 3/077 |
| 2024/0072633 A1* | 2/2024 | Liu | | H02M 3/07 |
| 2024/0146188 A1* | 5/2024 | Pilawa-Podgurski | | H02M 1/007 |
| 2024/0223086 A1* | 7/2024 | Liu | | H02M 1/0058 |
| 2024/0235370 A1* | 7/2024 | Liu | | H02M 3/07 |
| 2024/0297587 A1* | 9/2024 | Liu | | H02M 3/1584 |
| 2024/0372467 A1* | 11/2024 | Liu | | H02M 1/38 |

* cited by examiner

| State \ Item | State 1 | State 2 | State 3 | State 4 | State 5 | State 6 | State 7 | State 8 | State 9 | State 10 | State 11 | State 12 |
|---|---|---|---|---|---|---|---|---|---|---|---|---|
| QU1 | V |  | V |  | V |  |  |  |  | V | V |  |
| Qsu1 | V |  | V |  | V |  |  |  | V |  | V | V |
| Qcr1 |  | V |  | V |  | V |  |  |  | V |  | V |
| QL1 |  | V |  | V |  | V |  |  | V |  |  | V |
| QU2 |  | V | V |  |  |  |  | V |  | V |  | V |
| Qsu2 |  | V | V |  |  |  |  | V | V |  | V | V |
| Qcr2 | V |  |  | V |  |  |  | V |  | V | V |  |
| QL2 | V |  |  | V |  |  |  | V | V |  | V |  |
| VLX1 | 0.5*V1 | F | V1-VC1 | VC2 | V1-VC1 | F | F | VC2 | 0 | V1 | VC2 | 0 |
| VLX2 | F | 0.5*V1 | V1-VC2 | VC1 | F | VC1 | V1-VC2 | F | 0 | V1 | 0 | VC1 |
| L1,L2 |  |  |  |  |  |  |  |  |  |  | Coupled Inductor | Coupled Inductor |

Fig. 3

MULTI-PHASE SWITCHING CONVERTER AND CONTROL METHOD THEREOF

CROSS REFERENCE

The present invention claims priority to the U.S. provisional patent application Ser. No. 63/487,881, filed on Mar. 1, 2023 and claims priority to the TW patent application Ser. No. 112132649, filed on Aug. 29, 2023, all of which foregoing mentioned provisional and nonprovisional patent applications are incorporated herein in their entirety by their reference.

BACKGROUND OF THE INVENTION

Field of Invention

The present invention relates to a multi-phase switching converter and a control method thereof; particularly, it relates to such multi-phase switching converter and such control method which are more capable of mitigating electromagnetic interference (EMI).

Description of Related Art

Please refer to FIG. 1, which shows a schematic circuit diagram of a conventional dual-phase converter circuit. As shown in FIG. 1, the conventional dual-phase converter circuit 10 includes: two buck converter circuits 101a and 101b which are coupled in parallel to each other, so as to provide higher output current. The prior art shown in FIG. 1 has following drawbacks that: firstly, in order to withstand a maximum voltage level of an input voltage Vin, the conventional dual-phase converter circuit 10 needs switches Q1~Q4, each of which has an undesirably high rated voltage. Secondly, since both a voltage across an inductor L1 and a voltage across an inductor L2 are also relatively high, inductances and therefore sizes of the inductor L1 and the inductor L2 are inevitably large.

In view of the above, to overcome the drawbacks in the prior art, the present invention proposes a multi-phase switching converter and a control method which are more capable of mitigating EMI with reduced inductance, sizes and voltage stress.

SUMMARY OF THE INVENTION

From one perspective, the present invention provides a multi-phase switching converter, which is configured to operably perform a power conversion between a first voltage at a first power node and a second voltage at a second power node; the multi-phase switching converter comprising: a plurality of sub-switching converters, wherein the plurality of the sub-switching converters includes: a first sub-switching converter which includes: a first switched capacitor power conversion circuit and a first inductor connected in series to each other, wherein the first switched capacitor power conversion circuit is coupled between the first power node and a first switching node, and the first switched capacitor power conversion circuit includes: a first switch circuit and a first capacitor, wherein the first inductor is coupled between the second power node and the first switching node; a second sub-switching converter which includes: a second switched capacitor power conversion circuit and a second inductor connected in series to each other, wherein the second switched capacitor power conversion circuit is coupled between the first power node and a second switching node, and the second switched capacitor power conversion circuit includes: a second switch circuit and a second capacitor, wherein the second inductor is coupled between the second power node and the second switching node; and a control circuit, which is configured to operably generate a plurality of switching signals; wherein, according to the plurality of switching signals, the first switch circuit and the second switch circuit are configured to periodically switch the first inductor and the second inductor based upon a switching frequency between a plurality of corresponding electrical connection states, respectively; wherein the plurality of the switching signals are configured to switch the first capacitor and the second capacitor between the plurality of electrical connection states to obtain a first divided voltage and a second divided voltage by dividing the first voltage through switched capacitor switching, so as to switch the first switching node between the first divided voltage and a first reference potential and so as to switch the second switching node between a second divided voltage and a second reference potential a second reference potential, respectively, thereby performing the power conversion between the first power node and the second power node; wherein the first reference potential is correlated with the first voltage, a divided voltage of the first voltage, a ground potential, a voltage across the first capacitor, and/or a voltage across the second capacitor, and, the second reference potential is correlated with the first voltage, a divided voltage of the first voltage, the ground potential, a voltage across the first capacitor, and/or a voltage across the second capacitor, wherein the first switch circuit has a plurality of first switches and a first subsidiary switch, wherein the first subsidiary switch is coupled between the first capacitor and the first switching node, and the first subsidiary switch is configured to operably electrically connect the first capacitor and the first inductor in accordance with a corresponding one of the plurality of the switching signals; wherein the second switch circuit has a plurality of second switches and a second subsidiary switch, wherein the second subsidiary switch is coupled between the second capacitor and the second switching node, and the second subsidiary switch is configured to operably electrically connect the second capacitor and the second inductor in accordance with a corresponding one of the plurality of the switching signals.

In one embodiment, a first inductor current flowing through the first inductor and a second inductor current flowing through the second inductor are not in-phase and have a non-zero phase difference to each other.

In one embodiment, the plurality of the sub-switching converters are arranged in an circular sequence, and the first sub-switching converter and second sub-switching converter are periodically and consecutively switched between the plurality of the electrical connection states, so as to switch the first switching node between a divided voltage equal to a half of the first voltage and the first reference potential and so as to switch the second switching node between the divided voltage equal to a half of the first voltage and the second reference potential, thereby performing the power conversion between the first voltage and the second voltage.

In one embodiment, a number of the plurality of the sub-switching converters is equal to N, wherein all of the plurality of the sub-switching converters are periodically and consecutively switched between the plurality of the electrical connection states based upon an circular sequence, so as to correspondingly and respectively switch all plurality of switching nodes of all the sub-switching converters between a divided voltage equal to 1/N of the first voltage and the first or second reference potential, between a divided voltage equal to 2/N of the first voltage and the first or second reference potential, and so on to, between a divided voltage equal to (N−1)/N of the first voltage and the first or second reference potential, thereby performing the power conversion between the first voltage and the second voltage, wherein N denotes a positive integer greater than two.

In one embodiment, the plurality of the first switches (201111a) includes: a first high-side switch (QU1), which is coupled between the first power node (N1) and the first capacitor (C1); a first low-side switch (QL1), which is coupled between a third capacitor switching node (Nc3) and the first reference potential, the first capacitor and the first subsidiary switch are jointly coupled to the third capacitor switching node; and a first cross-over switch (Qcr1), which is coupled between a first capacitor switching node (Nc1) and the second switching node (LX2), wherein the first high-side switch and the first capacitor are jointly coupled to the first capacitor switching node.

In one embodiment, the plurality of the second switches (201111b) includes: a second high-side switch (QU2), which is coupled between the first power node (N1) and the second capacitor (C2); a second low-side switch (QL2), which is coupled between a fourth capacitor switching node (Nc4) and the second reference potential, wherein the second capacitor (C2) and the second subsidiary switch (Qsu2) are jointly coupled to the fourth capacitor switching node; and a second cross-over switch (Qcr2), which is coupled between a second capacitor switching node (Nc2) and the first switching node (LX1), wherein the second high-side switch (QU2) and the second capacitor (C2) are jointly coupled to the second capacitor switching node.

In one embodiment, the multi-phase switching converter further comprises: an auxiliary switched capacitor circuit, wherein the auxiliary switched capacitor circuit is coupled to the first sub-switching converter and the second sub-switching converter, wherein the auxiliary switched capacitor circuit includes: an auxiliary capacitor; and a plurality of auxiliary switches; wherein the control circuit is further configured to operably generate a plurality of auxiliary switching signals to correspondingly control the plurality of the corresponding auxiliary switches, the plurality of the corresponding first switches and the plurality of the corresponding second switches, so as to periodically switch the auxiliary capacitor between a first auxiliary electrical connection state and a second auxiliary electrical connection state, and to thereby perform the switched capacitor switching on the first voltage, so that a bias voltage across the auxiliary capacitor is regulated at an auxiliary divided voltage of the first voltage; wherein the first auxiliary electrical connection state includes: a series connection of the first capacitor and the second capacitor is connected in parallel with the auxiliary capacitor between an auxiliary switching node inside the auxiliary switched capacitor circuit and the first reference potential; wherein the second auxiliary electrical connection state includes: a series connection of the first capacitor and the second capacitor is connected in series with the auxiliary capacitor between the first power node and the second reference potential.

In one embodiment, subsequent to a zero current time point when a zero current detection signal indicates that a first inductor current flowing through the corresponding first inductor reaches a zero current, the control circuit is further configured to operably generate the corresponding switching signals for switching the corresponding first switch and/or the corresponding subsidiary switch, thereby switching the corresponding electrical connection state.

In one embodiment, subsequent to the zero current time point, after waiting for a dead-time, the control circuit is configured to operably generate the corresponding switching signal for switching the corresponding first switch, thereby switching the corresponding electrical connection state.

In one embodiment, the corresponding first switch accomplishes a soft switching of a zero-current switching (ZCS) and/or the soft switching of a zero-voltage switching (ZVS).

In one embodiment, based upon the first voltage, the second voltage and a load level, the control circuit is configured to operably generate the corresponding switching signals for switching the corresponding electrical connection state, so that the corresponding first inductor and/or the corresponding second inductor are magnetized within a constant ON time.

In one embodiment, in accordance with a load level, the control circuit is configured to operably generate the corresponding switching signals for switching the corresponding electrical connection state, and wherein the control circuit is configured to operably render the plurality of the sub-switching converters to operate in a boundary conduction mode (BCM), a continuous conduction mode (CCM) or a discontinuous conduction mode (DCM).

In one embodiment, subsequent to the corresponding first inductor and/or the corresponding second inductor is being demagnetized and subsequent to a first inductor current flowing through the corresponding first inductor reaching a zero current and/or a second inductor current flowing through the corresponding second inductor reaching a zero current, after waiting for a delay time, the control circuit is configured to operably switch the corresponding first switch and/or the corresponding second switch, thereby switching the corresponding electrical connection state.

In one embodiment, an inductor in one of the plurality of the sub-switching converters is electromagnetically coupled with an inductor in another one of the plurality of the sub-switching converters.

In one embodiment, the switching frequency is related to a resonant frequency, such that the multi-phase switching converter operates in a resonant mode, so as to control a voltage ratio of the second voltage to the first voltage to become correlated with: (1) a ratio of the first divided voltage to the first voltage or (2) a ratio of the second divided voltage to the first voltage, wherein the resonant frequency is related to a first capacitance of the first capacitor and a first inductance of the first inductor, or wherein the resonant frequency is related to a second capacitance of the second capacitor and a second inductance of the second inductor.

In one embodiment, the switching frequency is far greater than a resonant frequency to an extent that the multi-phase switching converter operates in a non-resonant mode, such that the second voltage is regulated at a preset level or the first voltage is regulated at a preset level, wherein the resonant frequency is related to a first capacitance of the first capacitor and a first inductance of the first inductor, or wherein the resonant frequency is related to a second capacitance of the second capacitor and a second inductance of the second inductor.

In one embodiment, the control circuit includes: a zero current detection circuit, wherein when a first inductor current flowing through the corresponding first inductor reaches a zero current, the zero current detection circuit is configured to operably generate a zero current detection signal for switching the corresponding first switch.

From another perspective, the present invention provides a control method of a multi-phase switching converter; the control method comprising following step: based upon a switching frequency, generating a plurality of switching signals, so as to periodically switch a first inductor of a first sub-switching converter in the multi-phase switching converter and a second inductor of a second sub-switching converter in the multi-phase switching converter between a plurality of corresponding electrical connection states, respectively, thus performing a power conversion between a first voltage at a first power node and a second voltage at a second power node; wherein the first sub-switching converter includes: a first switched capacitor power conversion circuit and a first inductor connected in series to each other, wherein the first switched capacitor power conversion circuit is coupled between the first power node and a first switching node, and the first switched capacitor power conversion circuit includes: a first switch circuit and a first capacitor, wherein the first inductor is coupled between the second power node and the first switching node; wherein the second sub-switching converter includes: a second switched capacitor power conversion circuit and a second inductor connected in series to each other, wherein the second switched capacitor power conversion circuit is coupled between the first power node and a second switching node, and the second switched capacitor power conversion circuit includes: a second switch circuit and a second capacitor, wherein the second inductor is coupled between the second power node and the second switching node; and wherein the plurality of the switching signals are configured to switch the first capacitor and the second capacitor between the plurality of electrical connection states to obtain a first divided voltage and a second divided voltage by dividing the first voltage through switched capacitor switching, so as to switch the first switching node between the first divided voltage and a first reference potential and so as to switch the second switching node between a second divided voltage and a second reference potential a second reference potential, respectively, thereby performing the power conversion between the first power node and the second power node; wherein the first reference potential is correlated with the first voltage, a divided voltage of the first voltage, a ground potential, a voltage across the first capacitor, and/or a voltage across the second capacitor, and, the second reference potential is correlated with the first voltage, a divided voltage of the first voltage, the ground potential, a voltage across the first capacitor, and/or a voltage across the second capacitor; wherein the first switch circuit has a plurality of first switches and a first subsidiary switch, wherein the first subsidiary switch is coupled between the first capacitor and the first switching node, and the first subsidiary switch is configured to operably electrically connect the first capacitor and the first inductor in accordance with a corresponding one of the plurality of the switching signals; wherein the second switch circuit has a plurality of second switches and a second subsidiary switch, wherein the second subsidiary switch is coupled between the second capacitor and the second switching node, and the second subsidiary switch is configured to operably electrically connect the second capacitor and the second inductor in accordance with a corresponding one of the plurality of the switching signals; wherein the sub-switching converters at least includes: the first sub-switching converter and the second sub-switching converter.

In one embodiment, the control method further includes following step: in a case where the plurality of the sub-switching converters are arranged in an circular sequence, periodically and consecutively switching the first sub-switching converter and second sub-switching converter between the plurality of the electrical connection states, so as to switch the first switching node between a divided voltage equal to a half of the first voltage and the first reference potential and so as to switch the second switching node between the divided voltage equal to a half of the first voltage and the second reference potential, thereby performing the power conversion between the first voltage and the second voltage.

In one embodiment, in a case where a number of the plurality of the sub-switching converters is equal to N, and accordingly, in this case, the control method further comprises following step: periodically and consecutively switching between the plurality of the electrical connection states based upon an circular sequence, so as to correspondingly and respectively switch all plurality of switching nodes of all the sub-switching converters between a divided voltage equal to 1/N of the first voltage and the first or second reference potential, between a divided voltage equal to 2/N of the first voltage and the first or second reference potential, and so on to, between a divided voltage equal to (N−1)/N of the first voltage and the first or second reference potential, thereby performing the power conversion between the first voltage and the second voltage, wherein N denotes a positive integer greater than two.

In one embodiment, the control method further includes following step: generating a plurality of auxiliary switching signals to correspondingly control the plurality of the corresponding auxiliary switches, the plurality of the corresponding first switches and the plurality of the corresponding second switches, so as to periodically switch the auxiliary capacitor between a first auxiliary electrical connection state and a second auxiliary electrical connection state, and to thereby perform the switched capacitor switching on the first voltage, so that a bias voltage across the auxiliary capacitor is regulated at an auxiliary divided voltage of the first voltage; wherein the first auxiliary electrical connection state includes: a series connection of the first capacitor and the second capacitor is connected in parallel with the auxiliary capacitor between an auxiliary switching node inside the auxiliary switched capacitor circuit and the first reference potential; wherein the second auxiliary electrical connection state includes: a series connection of the first capacitor and the second capacitor is connected in series with the auxiliary capacitor between the first power node and the second reference potential.

In one embodiment, the control method further includes following step: subsequent to a zero current time point when a zero current detection signal indicates that a first inductor current flowing through the corresponding first inductor reaches a zero current, generating the corresponding switching signals for switching the corresponding first switch and/or the corresponding subsidiary switch, thereby switching the corresponding electrical connection state.

In one embodiment, the control method further includes following step: subsequent to the zero current time point, after waiting for a dead-time, generating the corresponding switching signal for switching the corresponding first switch, thereby switching the corresponding electrical connection state.

In one embodiment, based upon the first voltage, the second voltage and a load level, generating the corresponding switching signals for switching the corresponding electrical connection state, so that the corresponding first inductor and/or the corresponding second inductor are magnetized within a constant ON time.

In one embodiment, in accordance with a load level, generating the corresponding switching signals for switching the corresponding electrical connection state, and wherein the control circuit is configured to operably render the plurality of the sub-switching converters to operate in a boundary conduction mode (BCM), a continuous conduction mode (CCM) or a discontinuous conduction mode (DCM).

In one embodiment, the control method further includes following step: subsequent to the corresponding first inductor and/or the corresponding second inductor is being demagnetized and subsequent to a first inductor current flowing through the corresponding first inductor reaching a zero current and/or a second inductor current flowing through the corresponding second inductor reaching a zero current, after waiting for a delay time, switching the corresponding first switch and/or the corresponding second switch, thereby switching the corresponding electrical connection state.

In one embodiment, the control method further includes following step: when a first inductor current flowing through the corresponding first inductor reaches a zero current, generating a zero current detection signal for switching the corresponding first switch.

The present invention is advantageous over the prior art, in that: the multi-phase switching converter of the present invention is well capable of accomplishing a relatively greater power conversion efficiency; and that, the present invention is well able to adopt an inductor having a relatively smaller size; and that, the present invention has capacity to generate a relatively lower voltage stress on the components within the multi-phase switching converter; and that, the present invention is more capable of mitigating EMI; and that, the present invention has enormous capacity to perform a resonant operation having a zero-current switching, thereby accomplishing a relatively lower power loss.

The objectives, technical details, features, and effects of the present invention will be better understood with regard to the detailed description of the embodiments below, with reference to the attached drawings.

BRIEF DESCRIPTION OF THE DRAWINGS

FIG. 3 is a table depicting switching states of the multi-phase switching converters, including those shown in FIG. 2D to FIG. 2O according to several different exemplary embodiments of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
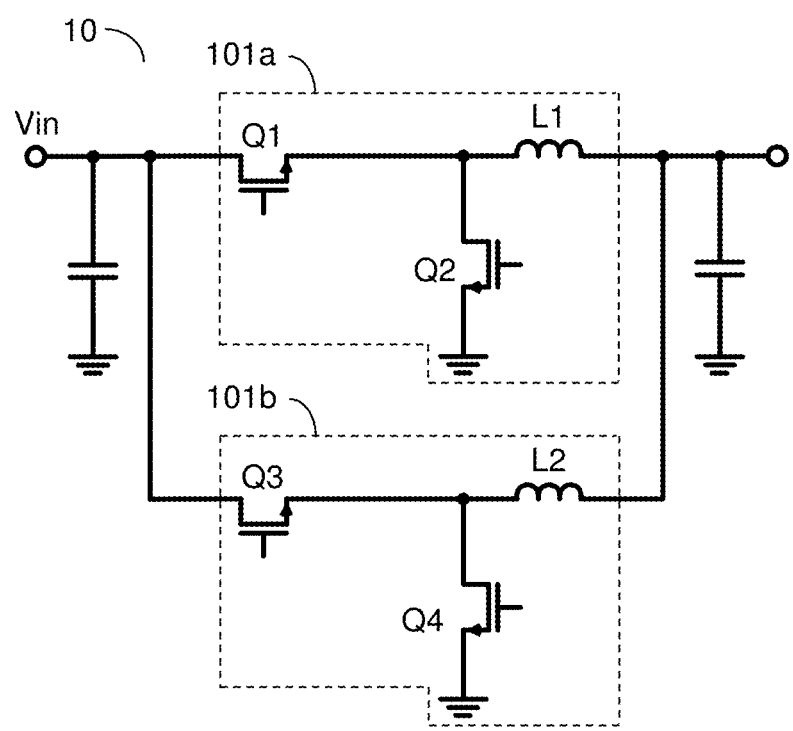
FIG. 1 shows a schematic circuit diagram of a conventional dual-phase converter circuit.
Figure 2A:
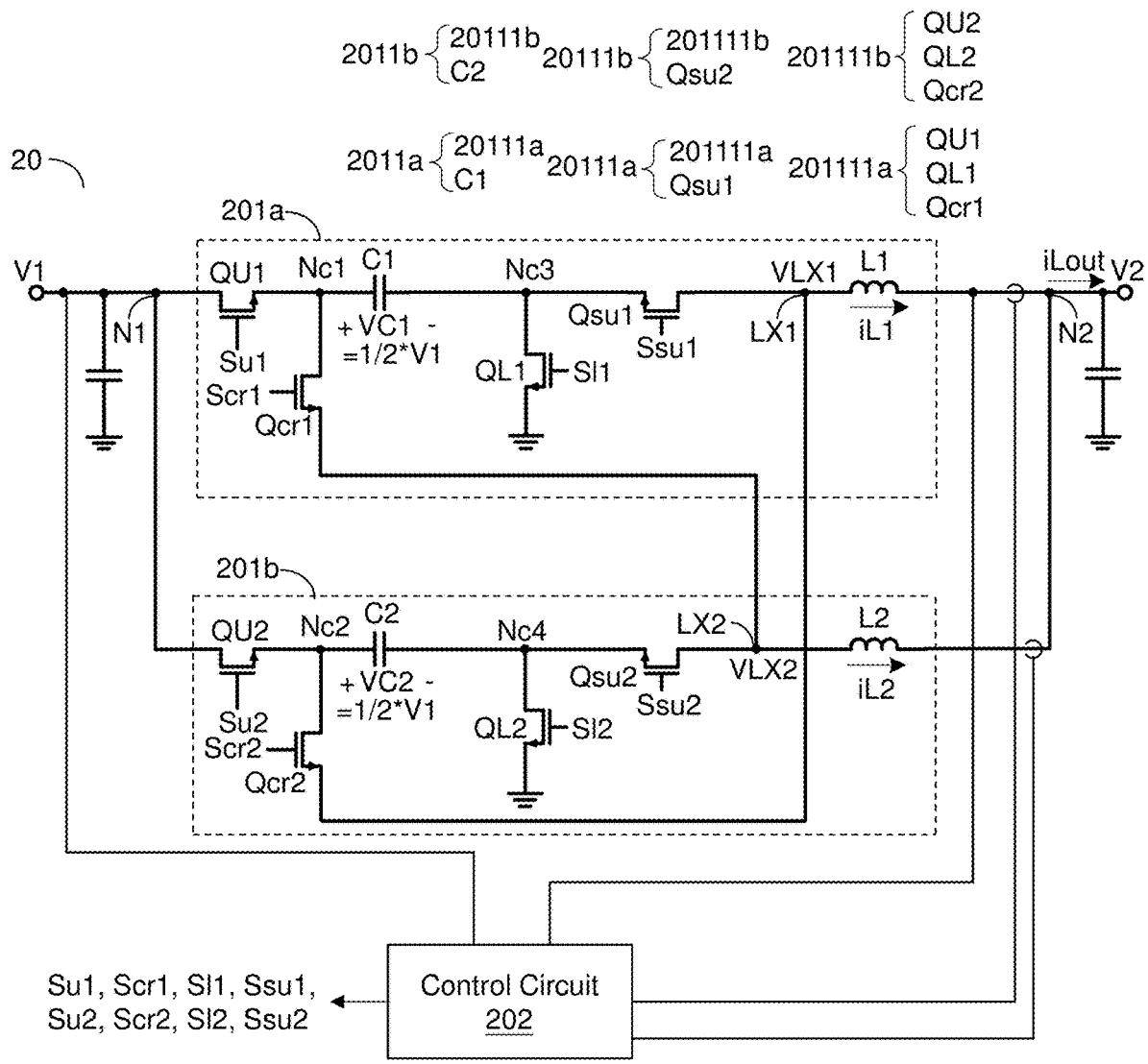
FIG. 2A shows a schematic circuit diagram of a multi-phase switching converter according to an exemplary embodiment of the present invention.

FIG. 2A shows a schematic circuit diagram of a multi-phase switching converter according to an exemplary embodiment of the present invention. As shown in FIG. 2A, the multi-phase switching converter 20 of the present invention is configured to operably perform a power conversion between a first voltage V1 at a first power node N1 and a second voltage V2 at a second power node N2. The multi-phase switching converter 20 of the present invention comprises: a sub-switching converter 201a, a sub-switching converter 201b and a control circuit 202. The control circuit 202 is configured to operably generate plural switching signals Su1, Su2, Sl1, Sl2, Scr1, Scr2, Ssu1 and Ssu2, so as to correspondingly control plural corresponding first switches 201111a and a first subsidiary switch Qsu1 of the corresponding first sub-switching converter 201a and plural corresponding second switches 201111b and a second subsidiary switch Qsu2 of the corresponding second sub-switching converter 201b.

The plural sub-switching converters includes: a first sub-switching converter 201a and a second sub-switching converter 201b. The first sub-switching converter 201a includes: a first switched capacitor power conversion circuit 2011a and an inductor L1 connected in series to each other. The first switched capacitor power conversion circuit 2011a is coupled between the first power node N1 and a switching node LX1. The first switched capacitor power conversion circuit 2011a includes: a first switch circuit 20111a and a capacitor C1. The inductor L1 is coupled between the second power node N2 and the first switching node LX1. The second sub-switching converter 201b includes: a second switched capacitor power conversion circuit 2011b and an inductor L2 connected in series to each other. The second switched capacitor power conversion circuit 2011b is coupled between the first power node N1 and a switching node LX2. The second switched capacitor power conversion circuit 2011b includes: a second switch circuit 20111b and a capacitor C2. The inductor L2 is coupled between the second power node N2 and the switching node LX2.

According to plural switching signals Su1, Su2, Sl1, Sl2, Scr1, Scr2, Ssu1 and Ssu2, the first switch circuit 20111a and the second switch circuit 20111b are configured to periodically switch the inductor L1 and the inductor L2, based upon a switching frequency, between plural corresponding electrical connection states, respectively. To be more specific, the switching signals Su1, Su2, Sl1, Sl2, Scr1, Scr2, Ssu1 and Ssu2 are configured to respectively and correspondingly control a high-side switch QU1, a high-side switch QU2, a low-side switch QL1, a low-side switch QL2, a cross-over switch Qcr1, a cross-over switch Qcr2, a subsidiary switch Qsu1 and a subsidiary switch Qsu2. The plural switching signals Su1, Su2, Sl1, Sl2, Scr1, Scr2, Ssu1 and Ssu2 are configured to switch the capacitor C1 and the capacitor C2 between the plurality of electrical connection states to obtain a first divided voltage and a second divided voltage by dividing the first voltage V1 through switched capacitor switching, so as to switch the switching node LX1 between the first divided voltage and a first reference potential and to switch the switching node LX2 between the second divided voltage and a second reference potential, respectively, thereby performing the power conversion between the first power node N1 and the second power node N2. In one embodiment, a minimum number of types of the foregoing divided voltage is equal to one, and, a maximum number of types of the foregoing divided voltage is equal to a number of the plural sub-switching converters minus one.

In one embodiment, the each of the first reference potential and the second reference potential is correlated with the first voltage V1, a divided voltage of the first voltage V1, a ground potential, a voltage VC1 across the capacitor C1 and/or a voltage VC2 across the capacitor C2.

The first switch circuit 20111a has plural first switches 201111a and a subsidiary switch Qsu1. The subsidiary switch Qsu1 is coupled between the capacitor C1 and the switching node LX1. The subsidiary switch Qsu1 is configured to electrically connect the capacitor C1 and the inductor L1 in accordance with the corresponding switching signal Ssu1. The second switch circuit 20111b has plural second switches 201111b and a subsidiary switch Qsu2. The subsidiary switch Qsu2 is coupled between the capacitor C2 and the switching node LX2. The subsidiary switch Qsu2 is configured to electrically connect the capacitor C2 and the inductor L2 in accordance with the corresponding switching signal Ssu2.

In one embodiment, the first sub-switching converter 201a and second sub-switching converter 201b are arranged in an circular sequence, and the first sub-switching converter 201a and the second sub-switching converter 201b are periodically and consecutively switched between the plural the electrical connection states, so as to switch the switching node LX1 between a divided voltage equal to a half of the first voltage V1 and the first reference potential and so as to switch the switching node LX2 between the divided voltage equal to a half of the first voltage V1 and the second reference potential, thereby performing the power conversion between the first voltage V1 and the second voltage V2.

As shown in FIG. 2A, the plural first switches 201111a in the first sub-switching converter 201a include: the high-side switch QU1, the low-side switch QL1 and the cross-over switch Qcr1. The high-side switch QU1 is coupled between the first power node N1 and the capacitor C1 of the sub-switching converter 201a. The low-side switch QL1 is coupled between the capacitor switching node Nc3 of the sub-switching converter 201a and the reference potential, wherein the capacitor C1 and the subsidiary switch Qsu1 are jointly coupled to the third capacitor switching node Nc3. The cross-over switch Qcr1 is coupled between a capacitor switching node Nc1 and the inductor switching node LX2 in the sub-switching converter 201b, wherein the first high-side switch QU1 and the capacitor C1 are jointly coupled to the capacitor switching node Nc1.

As shown in FIG. 2A, the plural second switches 201111b in the second sub-switching converter 201b include: a high-side switch QU2, a low-side switch QL2 and a cross-over switch Qcr2. The high-side switch QU2 is coupled between the first power node N1 and the capacitor C2. The low-side switch QL2 is coupled between a capacitor switching node Nc4 and the reference potential, wherein the capacitor C2 and the subsidiary switch Qsu2 are jointly connected on the capacitor switching node Nc4. The cross-over switch Qcr2 is coupled between a capacitor switching node Nc2 and the inductor switching node LX1, wherein the high-side switch QU2 and the capacitor C2 are jointly coupled to the capacitor switching node Nc2.

Figure 2B:
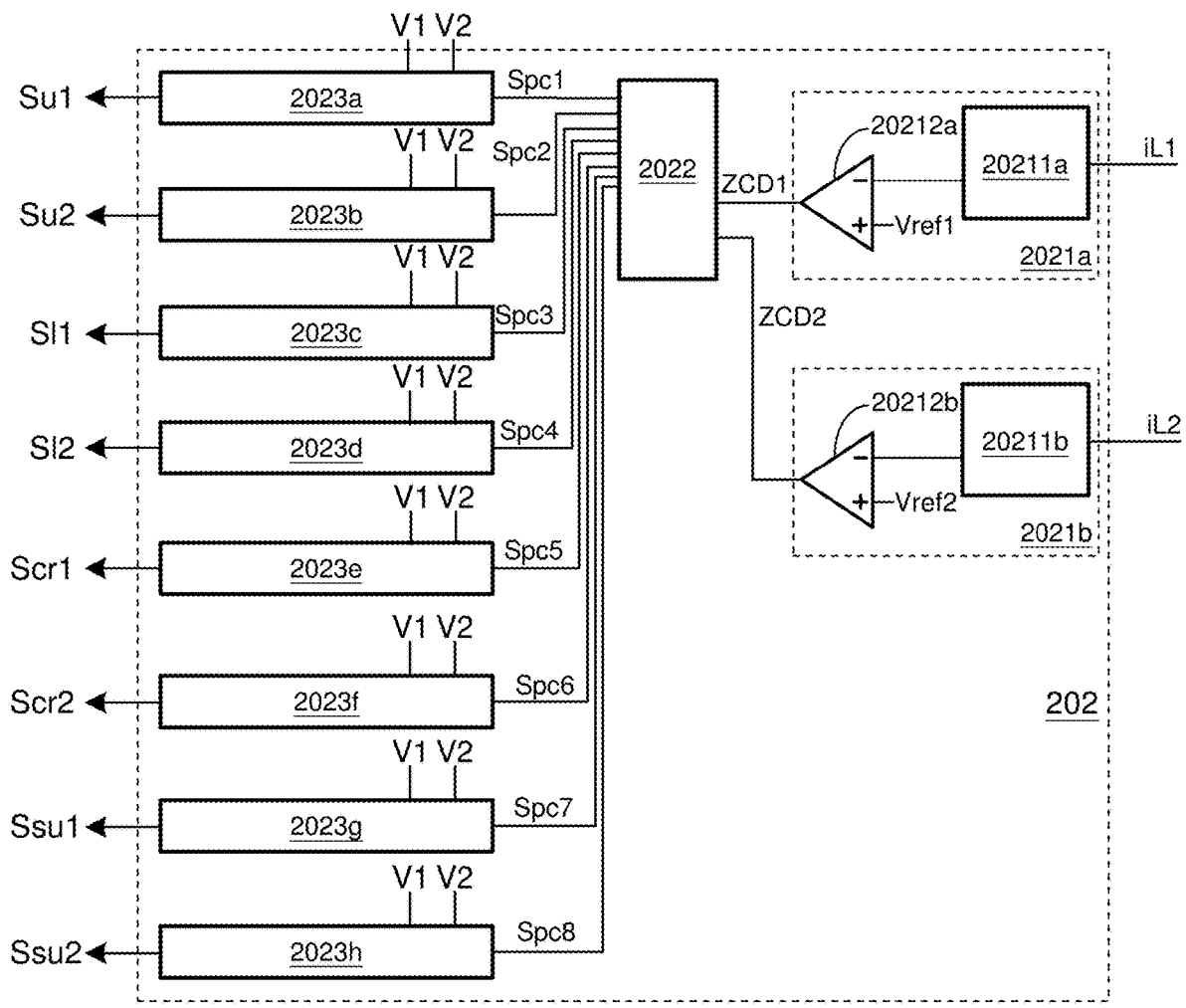
FIG. 2B shows a schematic circuit diagram of a control circuit in a multi-phase switching converter according to an exemplary embodiment of the present invention.

FIG. 2B shows a schematic circuit diagram of a control circuit in a multi-phase switching converter according to an exemplary embodiment of the present invention. As shown in FIG. 2B, in accordance with the first voltage V1, the second voltage V2, an inductor current iL1, an inductor current iL2 and a load level (i.e., a power consumption level or a current level of a load circuit), the control circuit 202 is configured to operably generate Su1, Su2, Sl1, Sl2, Scr1, Scr2, Ssu1 and Ssu2 for respectively switching the high-side switch QU1, the high-side switch QU2, the low-side switch QL1, the low-side switch QL2, the cross-over switch Qcr1, the cross-over switch Qcr2, the subsidiary switch Qsu1 and the subsidiary switch Qsu2, thereby switching between different electrical connection states. In one embodiment, the control circuit 202 is configured to magnetize the corresponding inductor (i.e., inductor L1 and/or L2) within a constant ON time. The control circuit 202 includes: a zero current detection circuit 2021a, a zero current detection circuit 2021b, a phase control logic circuit 2022 and ON time controller circuits 2023a~2023h.

The zero current detection circuit 2021a is coupled between the phase control logic circuit 2022 and the second voltage V2, and is configured to operably detect the inductor current iL1. The zero current detection circuit 2021b is coupled between the phase control logic circuit 2022 and the second voltage V2, and is configured to operably detect the inductor current iL2. When the zero current detection circuit 2021a detects that the inductor current iL1 reaches a zero current, the zero current detection circuit 2021a generates a zero current detection signal ZCD1 as an input signal for the phase control logic circuit 2022. When the zero current detection circuit 2021b detects that the inductor current iL2 reaches a zero current, the zero current detection circuit 2021b generates a zero current detection signal ZCD2 as an input signal for the phase control logic circuit 2022. In this embodiment, the zero current detection circuit 2021a includes a corresponding current sensing circuit 20211a configured to operably sense the inductor current iL1, and, the zero current detection circuit 2021b includes a corresponding current sensing circuit 20211b configured to operably sense the inductor current iL2. The zero current detection circuit 2021a includes a corresponding comparator 20212a configured to operably compare the sensed inductor current iL1 with a reference signal Vref1, so as to generate the zero current detection signal ZCD1, and, the zero current detection circuit 2021b includes a corresponding comparator 20212b configured to operably compare the sensed inductor current iL2 with a reference signal Vref2, so as to generate the zero current detection signal ZCD2.

The phase control logic circuit 2022 is configured to operably generate phase control signals Spc1~Spc6 in accordance with the first voltage V1, the second voltage V2, the zero current detection signal ZCD1 and/or the zero current detection signal ZCD2. According to the phase control signals Spc1~Spc6, the first voltage V1 and the second voltage V2, the ON time controller circuits 2023a, 2023b, 2023c, 2023d, 2023e, 2023f, 2023g and 2023h are configured to generate the switching signal Su1, Su2, Sl1, Sl2, Scr1, Scr2, Ssu1, and Ssu2 respectively.

Figure 2C:
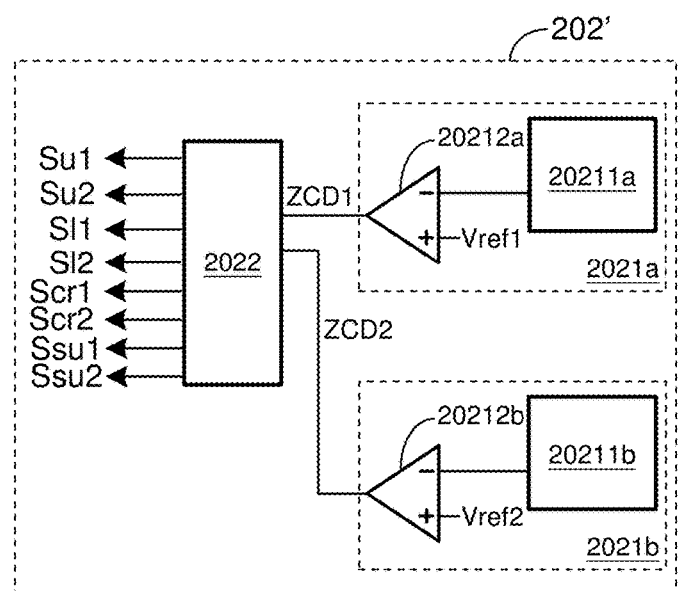
FIG. 2C shows a schematic circuit diagram of a control circuit in a multi-phase switching converter according to another exemplary embodiment of the present invention.

FIG. 2C shows a schematic circuit diagram of a control circuit in a multi-phase switching converter according to another exemplary embodiment of the present invention. The control circuit 202' of this embodiment shown in FIG. 2C is similar to the control circuit 202 of the embodiment shown in FIG. 2B, but with differences described as the following. The control circuit 202' of this embodiment omits the ON time controller circuits 2023a~2023h and the phase control signals Spc1~Spc8. That is, the phase control logic circuit 2022 are configured to generate switching signals Su1, Su2, Sl1, Sl2, Scr1 and Scr2 directly based upon the zero current detection signal ZCD1 or the zero current detection signal ZCD2.

FIG. 2D to FIG. 2O are schematic circuit diagrams and schematic operation diagrams of exemplary multi-phase switching converters according to several different exemplary embodiments of the present invention. FIG. 3 is a table depicting switching states of the multi-phase switching converters, including those shown in FIG. 2D to FIG. 2O according to several different exemplary embodiments of the present invention. FIG. 2D to FIG. 2O show electrical connection relationships, corresponding to a first electrical connection state S1 to a twelfth electrical connection state S12, of the capacitors C1, C2, the inductors L1, L2, the first voltage V1, the second voltage V2 and a reference potential (e.g., in this embodiment, the reference potential is a ground potential) in the multi-phase switching converter 20.

In one embodiment, the power conversion between the first voltage V1 and the second voltage V2 can be achieved by periodically repeating a combination of the electrical connection states selected among the first electrical connection state S1 to the twelfth electrical connection state S12. From one perspective, the power conversion between the first voltage V1 and the second voltage V2 can be achieved by periodically cycling a combination of the electrical connection relationships among the capacitor C1, the inductor L1, the first voltage V1 and the reference potential (e.g., in this embodiment, the reference potential is a ground potential), in the multi-phase switching converter 20. Note that, in FIG. 2D to FIG. 2O, when a switch symbol is depicted in grey, it indicates that the switch is controlled to be OFF; and when a switch symbol is depicted in black, it indicates that the switch is controlled to be ON.

Figure 2D:
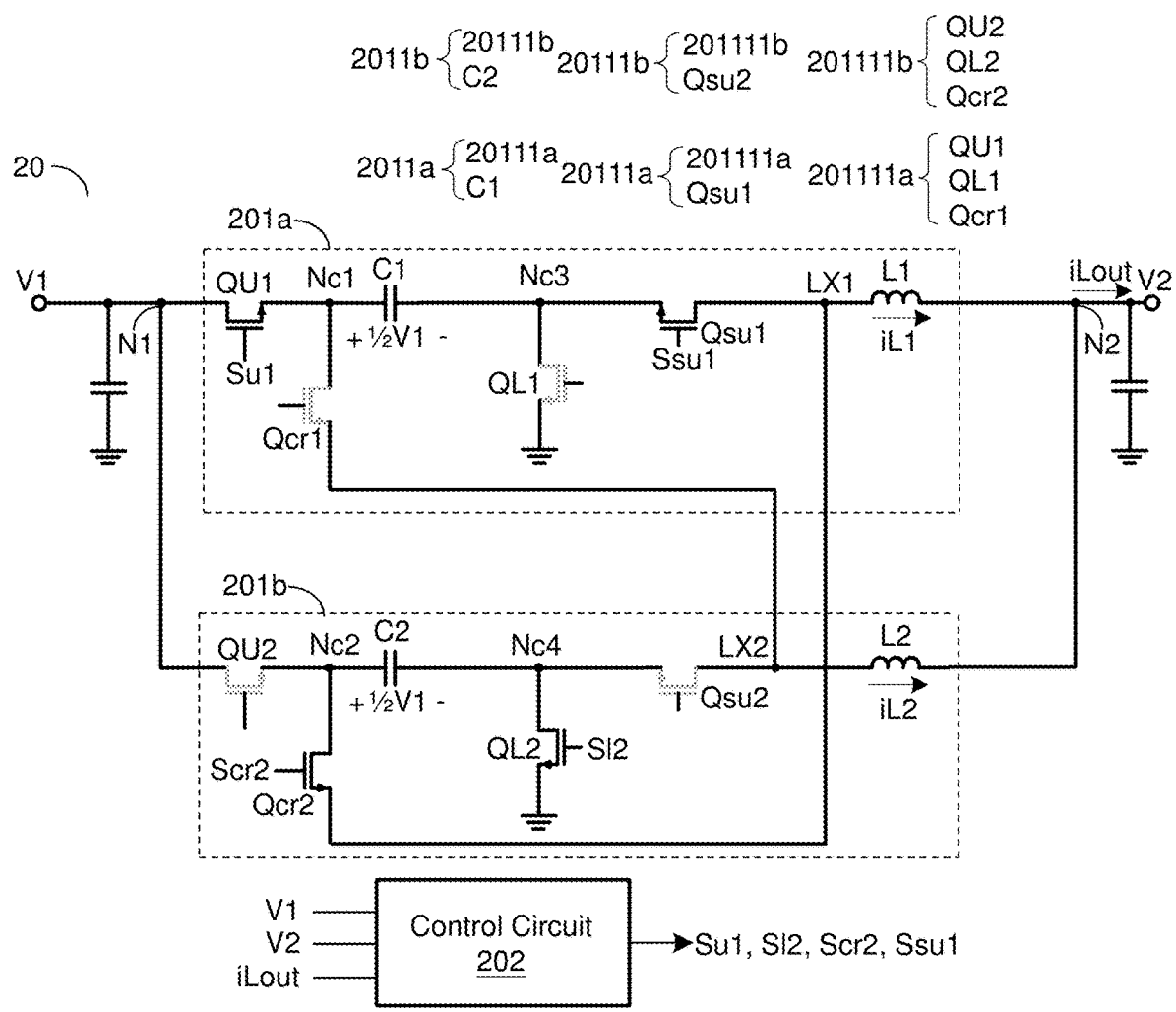
FIG. 2D to FIG. 2O are schematic circuit diagrams and schematic operation diagrams of exemplary multi-phase switching converters according to several different exemplary embodiments of the present invention.

As shown in FIG. 2D and FIG. 3, within the first electrical connection state S1, the high-side switch QU2, the cross-over switch Qcr1, the low-side switch QL1 and the subsidiary switch Qsu2 are switched to be OFF, and, the high-side switch QU1, the cross-over switch Qcr2, the low-side switch QL2 and the subsidiary switch Qsu1 are switched to be ON based upon the switching signals Su1, Scr2, Sl2 and Ssu1, respectively, such that the capacitor C1 and the capacitor C2 are electrically connected in series between the first voltage V1 and the reference potential (e.g., in this embodiment, the reference potential is a ground potential) and such that the capacitor C1 and the capacitor C2 are coupled to a capacitor switching node Nc2, with the inductor L1 being coupled between the switching node LX1 and the second voltage V2, thus charging the capacitor C1 and discharging the capacitor C2.

Figure 2E:
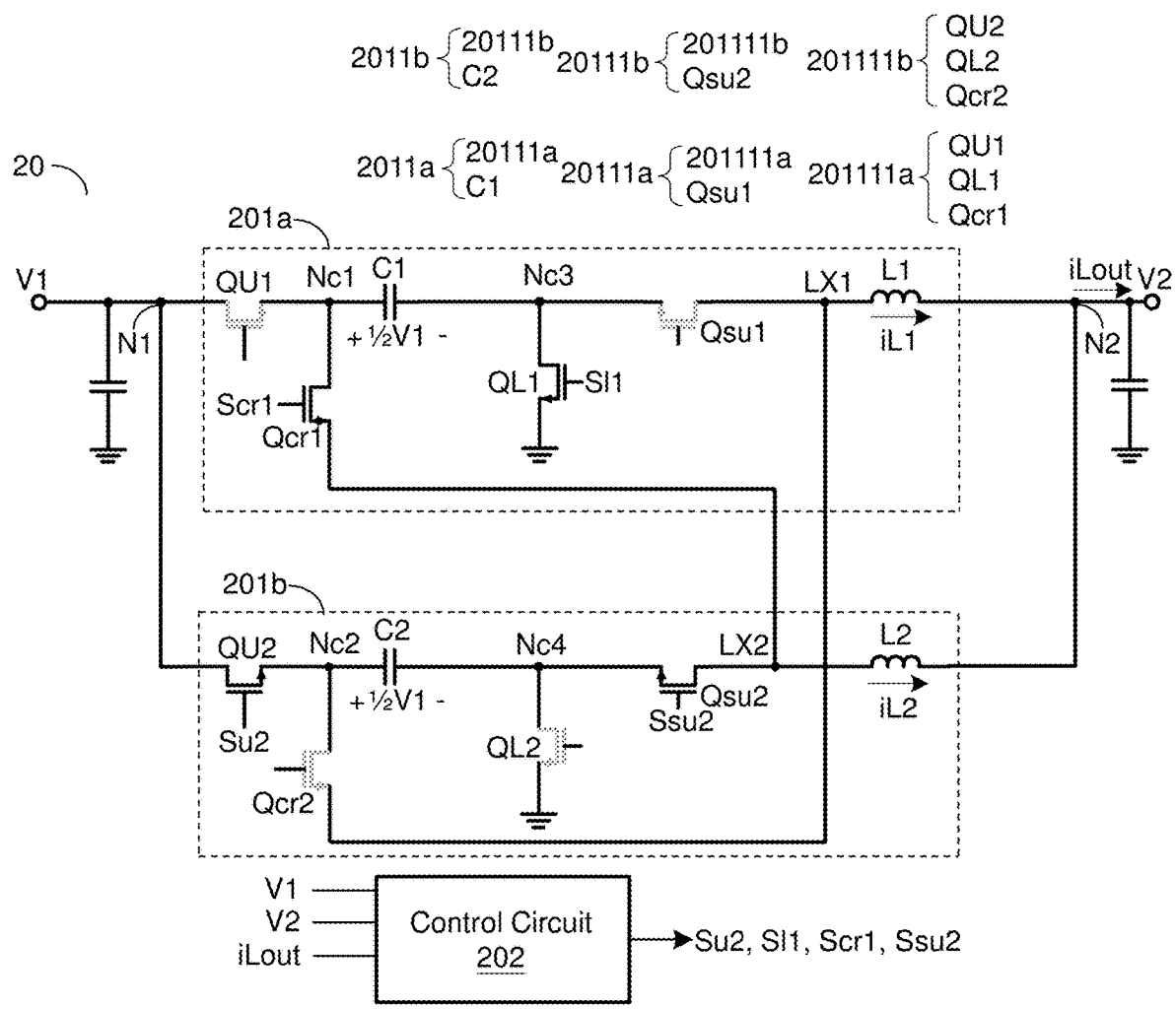

As shown in FIG. 2E and FIG. 3, within the second electrical connection state S2, the high-side switch QU1, the cross-over switches Qcr2, the low-side switch QL2 and the subsidiary switch Qsu1 are switched to be OFF, and, the high-side switch QU2, the cross-over switch Qcr1, the low-side switch QL1 and the subsidiary switch Qsu2 are switched to be ON, based upon the switching signals Su2, Scr1, Sl1 and Ssu2, respectively, such that the capacitor C2 and the capacitor C1 are electrically connected in series between the first voltage V1 and the reference potential (e.g., in this embodiment, the reference potential is a ground potential) and such that the capacitor C2 and the capacitor C1 are jointly electrically connected to the switching node LX1, with the inductor L2 being coupled between the switching node LX2 and the second voltage V2, thus charging the capacitor C2 and discharging the capacitor C1.

Figure 2F:
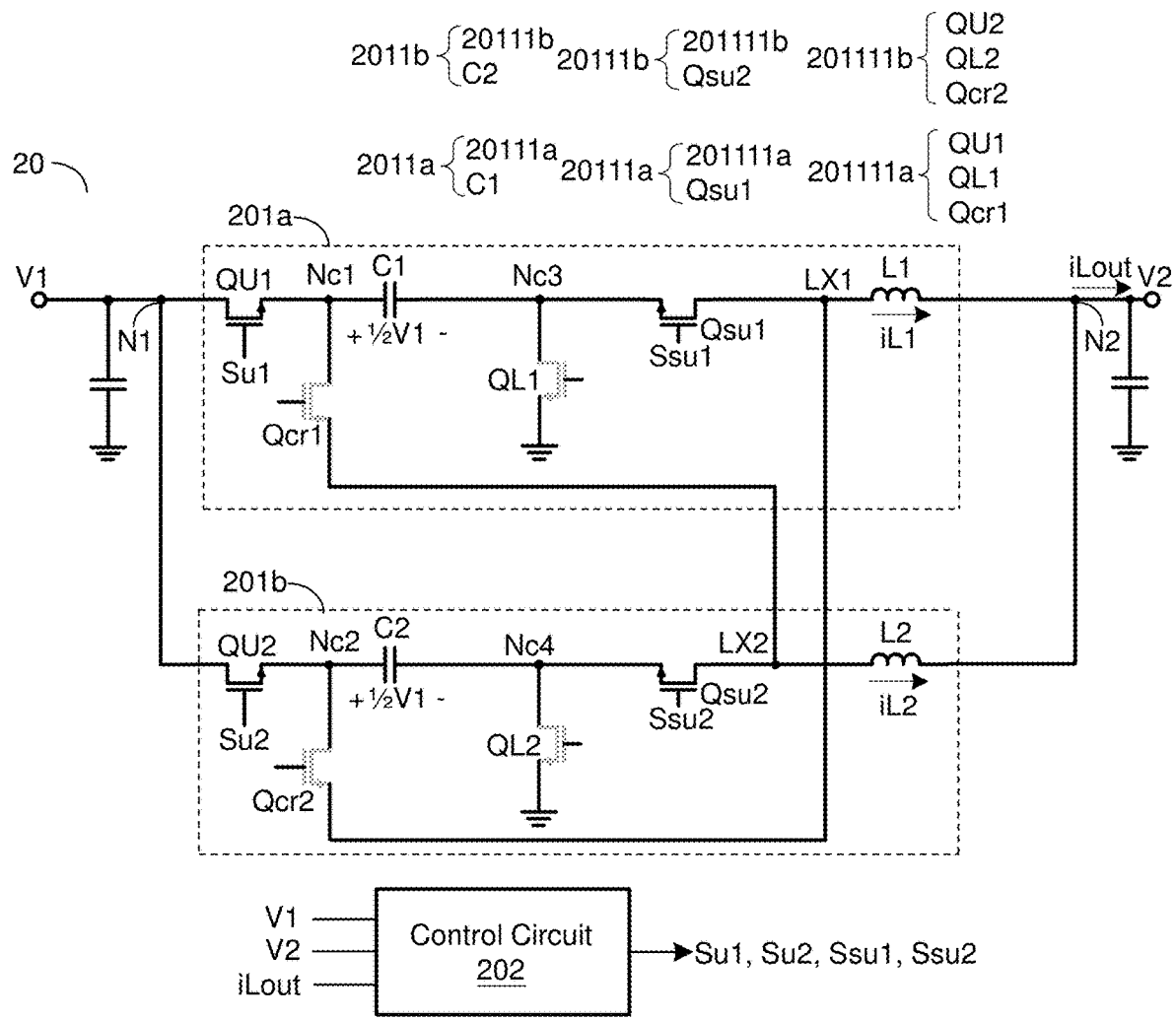

As shown in FIG. 2F and FIG. 3, within the third electrical connection state S3, the cross-over switch Qcr1, the cross-over switch Qcr2, the low-side switch QL1 and the low-side switch QL2 are switched to be OFF, and, the high-side switch QU1, the high-side switch QU2, the subsidiary switch Qsu1 and the subsidiary switch Qsu2 are switched to be ON based upon the switching signals Su1, Su2, Ssu1 and Ssu2, respectively, such that the capacitor C1 and the inductor L1 are electrically connected in series between the first voltage V1 and the second voltage V2 and such that the capacitor C2 and the inductor L2 are electrically connected in series between the first voltage V1 and the second voltage V2, thus charging the capacitor C1 and charging the capacitor C2.

Figure 2G:
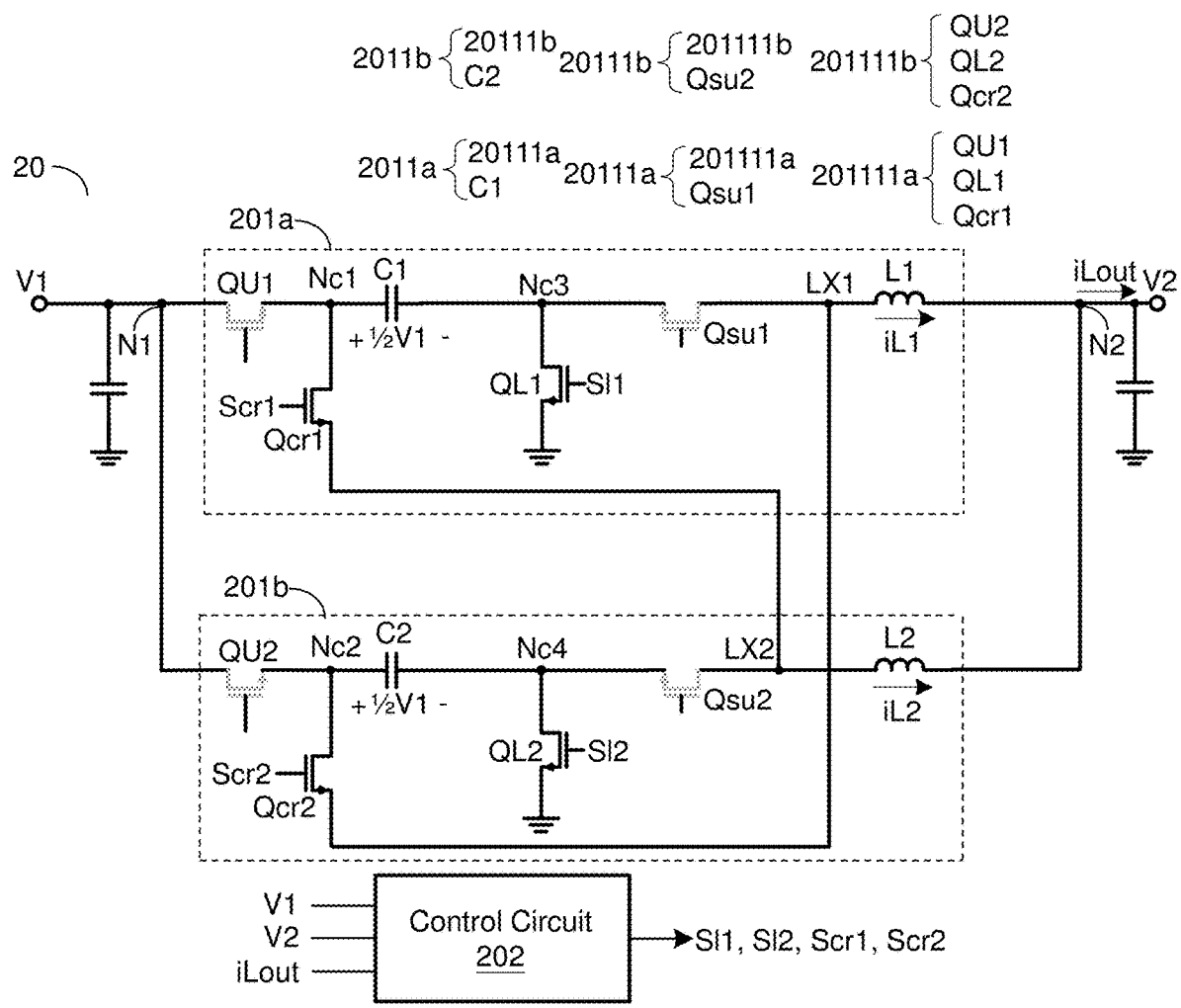

As shown in FIG. 2G and FIG. 3, within the fourth electrical connection state S4, the high-side switch QU1, the high-side switch QU2, the subsidiary switch Qsu1 and the subsidiary switch Qsu2 are switched to be OFF, and, the cross-over switch Qcr1, the cross-over switch Qcr2, the low-side switch QL1 and the low-side switch QL2 are switched to be ON based upon the switching signals Scr1, Scr2, Sl1 and Sl2, respectively, such that the capacitor C1 and the inductor L2 are electrically connected in series between the reference potential (e.g., in this embodiment, the reference potential is a ground potential) and such that the second voltage V2 and the capacitor C2 and the inductor L2 are electrically connected in series between the reference potential (e.g., in this embodiment, the reference potential is a ground potential) and the second voltage V2, thus discharging the capacitor C1 and charging the capacitor C2.

Figure 2H:
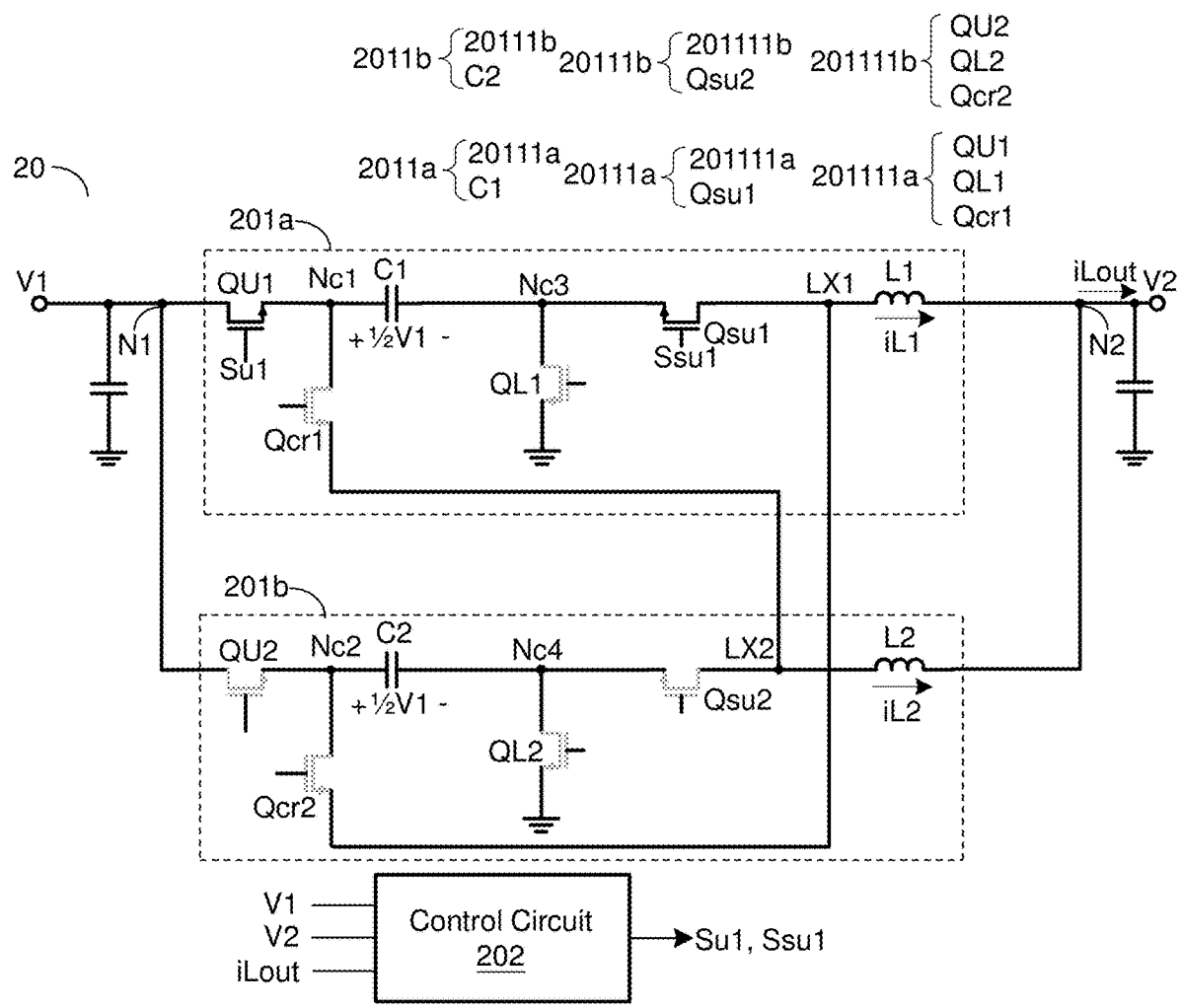

As shown in FIG. 2H and FIG. 3, within the fifth electrical connection state S5, the high-side switch QU2, the low-side switch QL1, the low-side switch QL2, the cross-over switch Qcr1, the cross-over switch Qcr2 and the subsidiary switch Qsu2 are switched to be OFF, and, the high-side switch QU1 and the subsidiary switch Qsu1 are switched to be ON based upon the switching signals Su1 and Ssu1, respectively, such that the capacitor C1 and the inductor L1 are electrically connected in series between the reference potential (e.g., in this embodiment, the reference potential is a ground potential) and the first voltage V1, thus charging the capacitor C1 under a light loading condition.

Figure 2I:
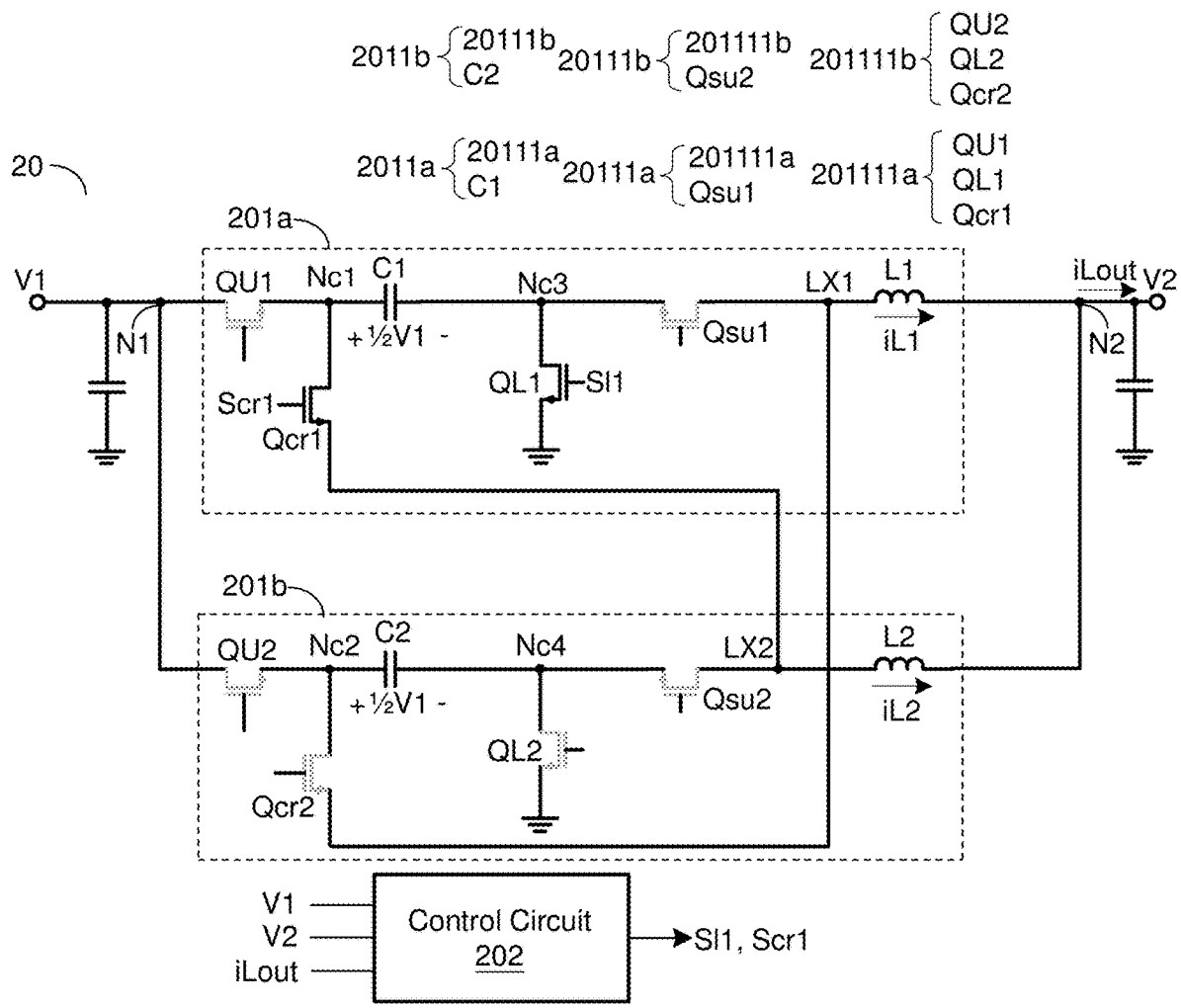

As shown in FIG. 2I and FIG. 3, within the sixth electrical connection state S6, the high-side switch QU1, the high-side switch QU2, the low-side switch QL2, the cross-over switch Qcr2, the subsidiary switch Qsu1 and the subsidiary switch Qsu2 are switched to be OFF, and, the low-side switch QL1 and the cross-over switch Qcr1 are switched to be ON based upon the switching signals Sl1 and Scr1, respectively, such that the capacitor C1 and the inductor L2 are electrically connected in series between the reference potential (e.g., in this embodiment, the reference potential is a ground potential) and the second voltage V2, thus discharging the capacitor C1 under a light loading condition.

Figure 2J:
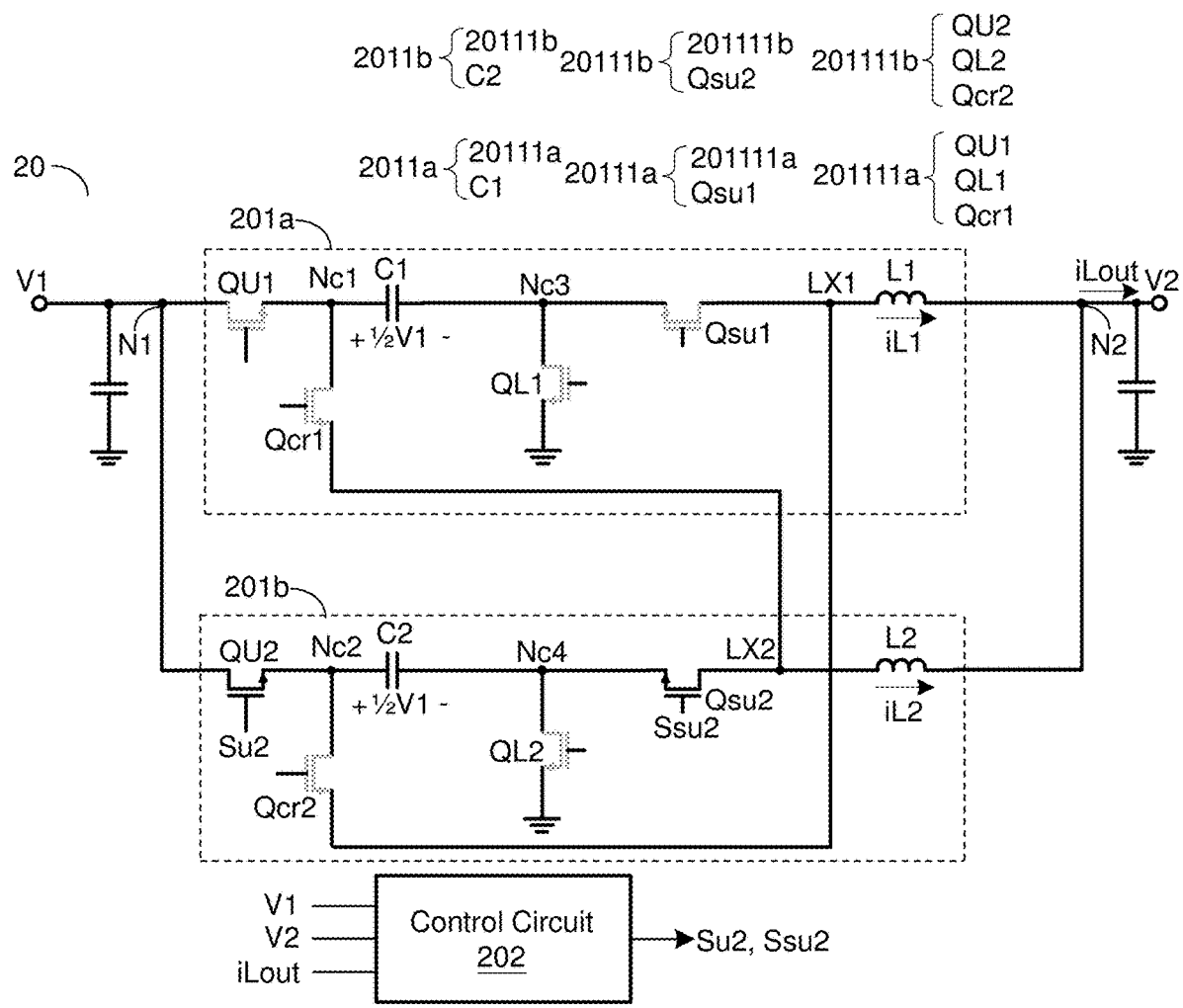

As shown in FIG. 2J and FIG. 3, within the seventh electrical connection state S7, the high-side switch QU1, the low-side switches QL1, QL2, the cross-over switches Qcr1, Qcr2 and the subsidiary switch Qsu1 are switched to be OFF, and, the high-side switch QU2 and the subsidiary switch Qsu2 are switched to be ON based upon the switching signals Su2 and Ssu2, respectively, such that the capacitor C2 and the inductor L2 are electrically connected in series between the first voltage V1 and the second voltage V2, thus charging the capacitor C2 under a light loading condition.

Figure 2K:
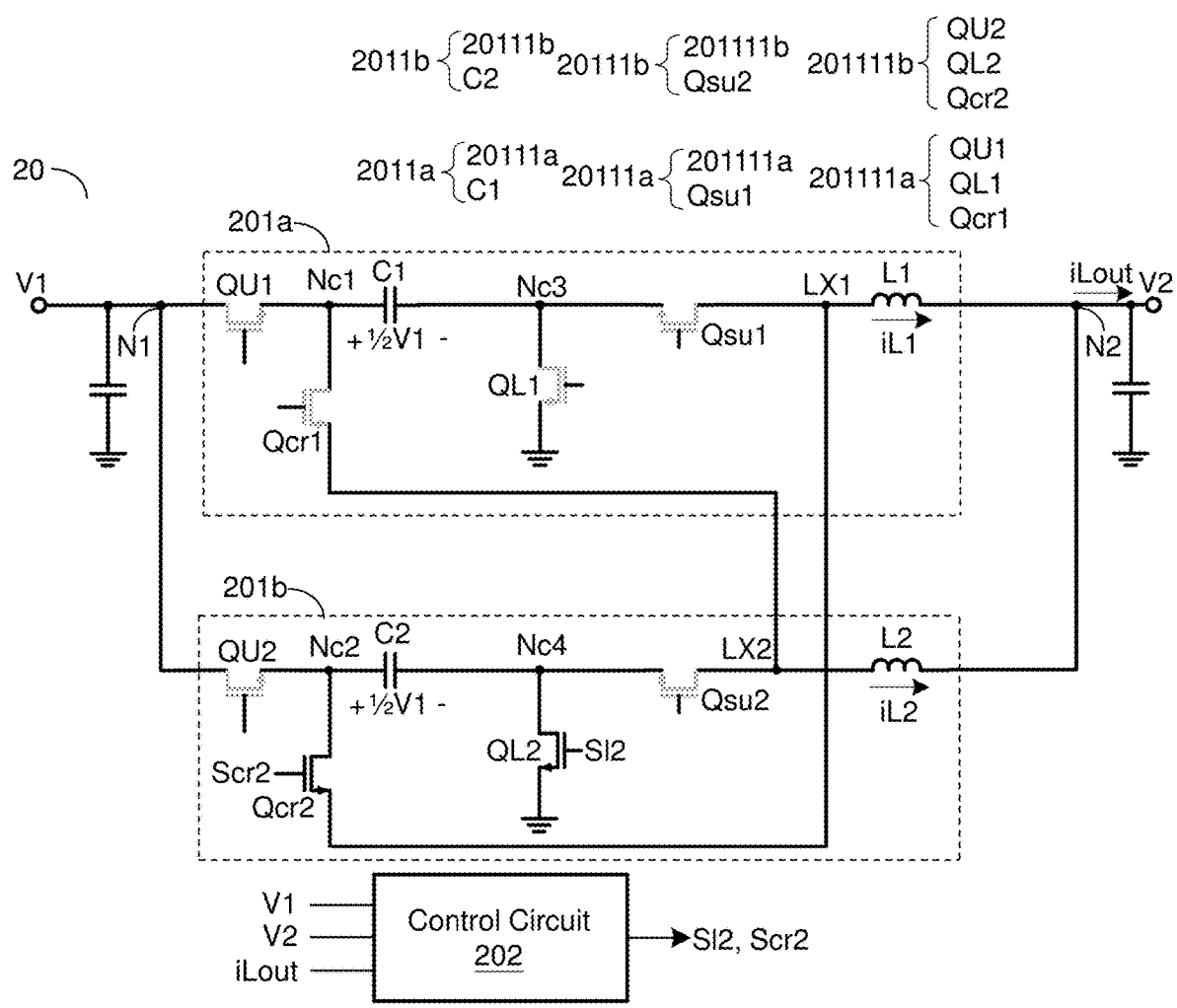

As shown in FIG. 2K and FIG. 3, within the eighth electrical connection state S8, the high-side switch QU1, the high-side switch QU2, the low-side switch QL1, the cross-over switch Qcr1, the subsidiary switch Qsu1 and the subsidiary switch Qsu2 are switched to be OFF, and, the low-side switch QL2 and the cross-over switch Qcr2 are switched to be ON based upon the switching signals Sl2 and Scr2, respectively, such that the capacitor C2 and the inductor L1 are electrically connected in series between the reference potential (e.g., in this embodiment, the reference potential is a ground potential) and the second voltage V2, thus discharging the capacitor C2 under a light loading condition.

Figure 2L:
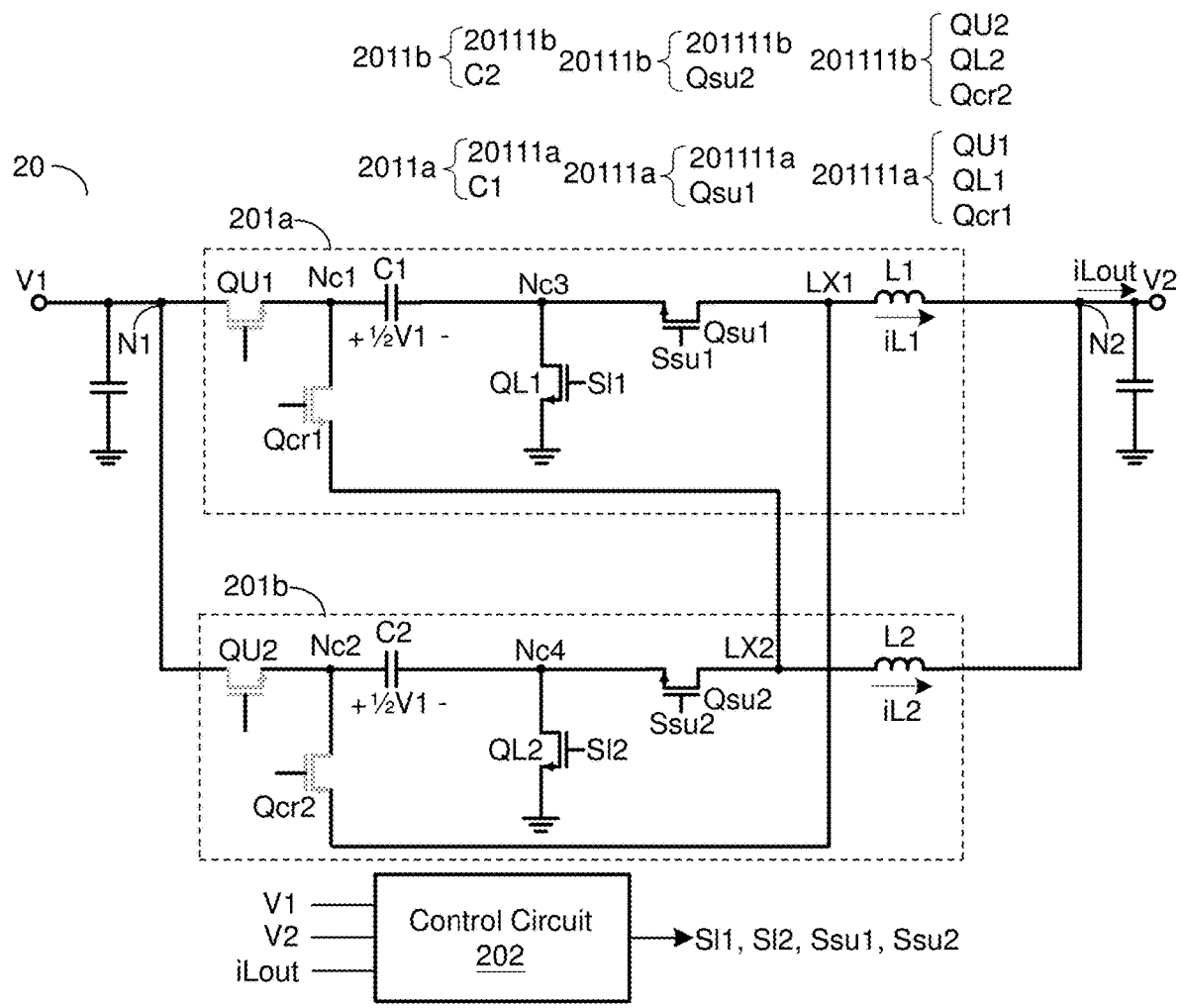

As shown in FIG. 2L and FIG. 3, within the ninth electrical connection state S9, the high-side switch QU1, the high-side switch QU2, the cross-over switch Qcr1 and the cross-over switch Qcr2 are switched to be OFF, and, the low-side switch QL1, the low-side switch QL2, the subsidiary switch Qsu1 and the subsidiary switch Qsu2 are switched to be ON based upon the switching signals Sl1, Sl2, Ssu1 and Ssu2, such that the inductor L1 and the inductor L2 are electrically connected in parallel between the reference potential (e.g., in this embodiment, the reference potential is a ground potential) and the second voltage V2, thereby incurring the inductor current iL1 and the inductor current iL2 to freewheel.

Figure 2M:
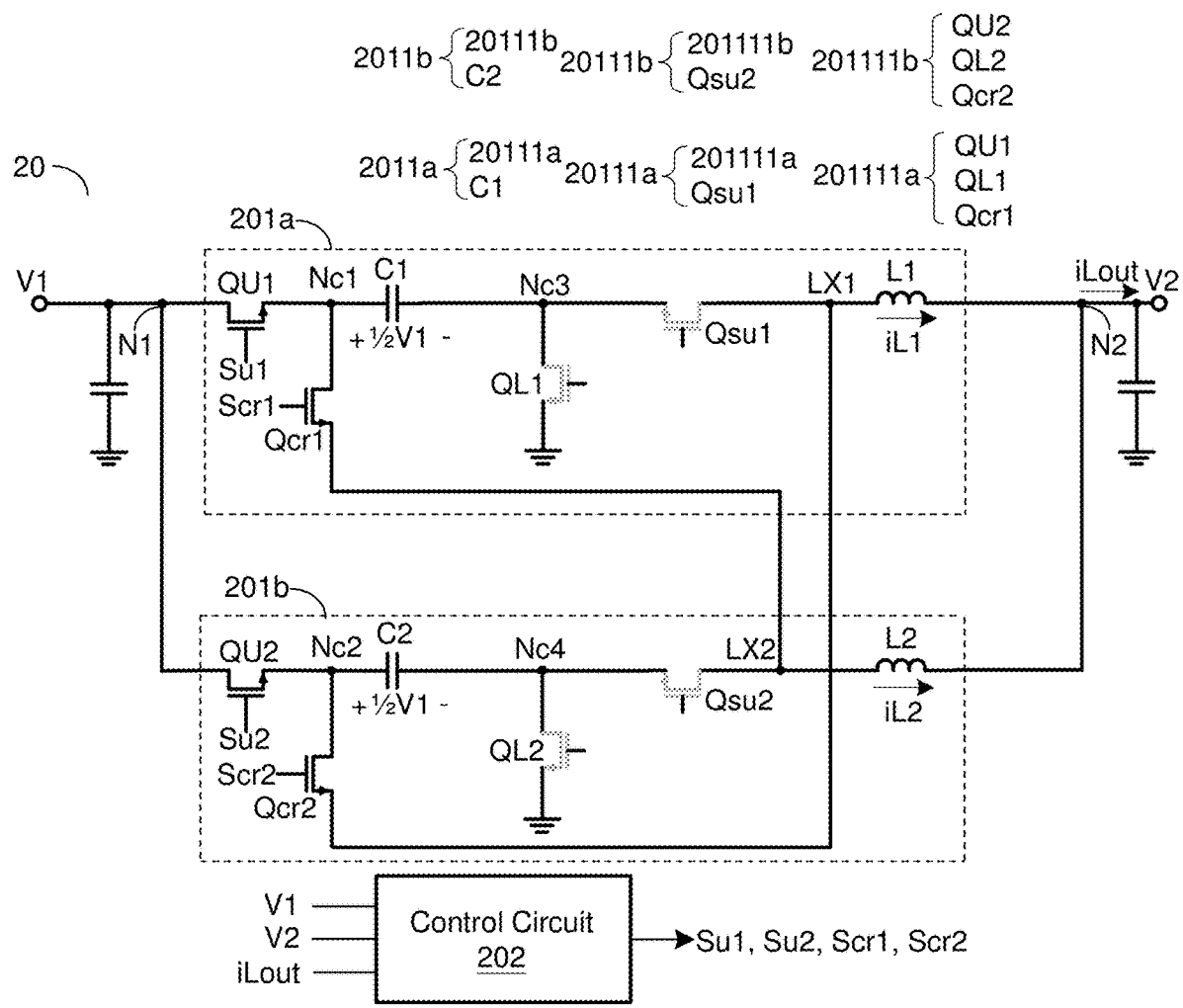

As shown in FIG. 2M and FIG. 3, within the tenth electrical connection state S10, the low-side switches QL1, QL2, the and the subsidiary switches Qsu1 and Qsu2 are switched to be OFF, and, the high-side switches QU1, QU2 and the cross-over switches Qcr1 and Qcr2 are switched to be ON based upon the switching signals Su1, Su2, Scr1 and Scr2, respectively, such that the inductor L1 and the inductor L2 are electrically connected in parallel between the first voltage V1 and the second voltage V2.

Figure 2N:
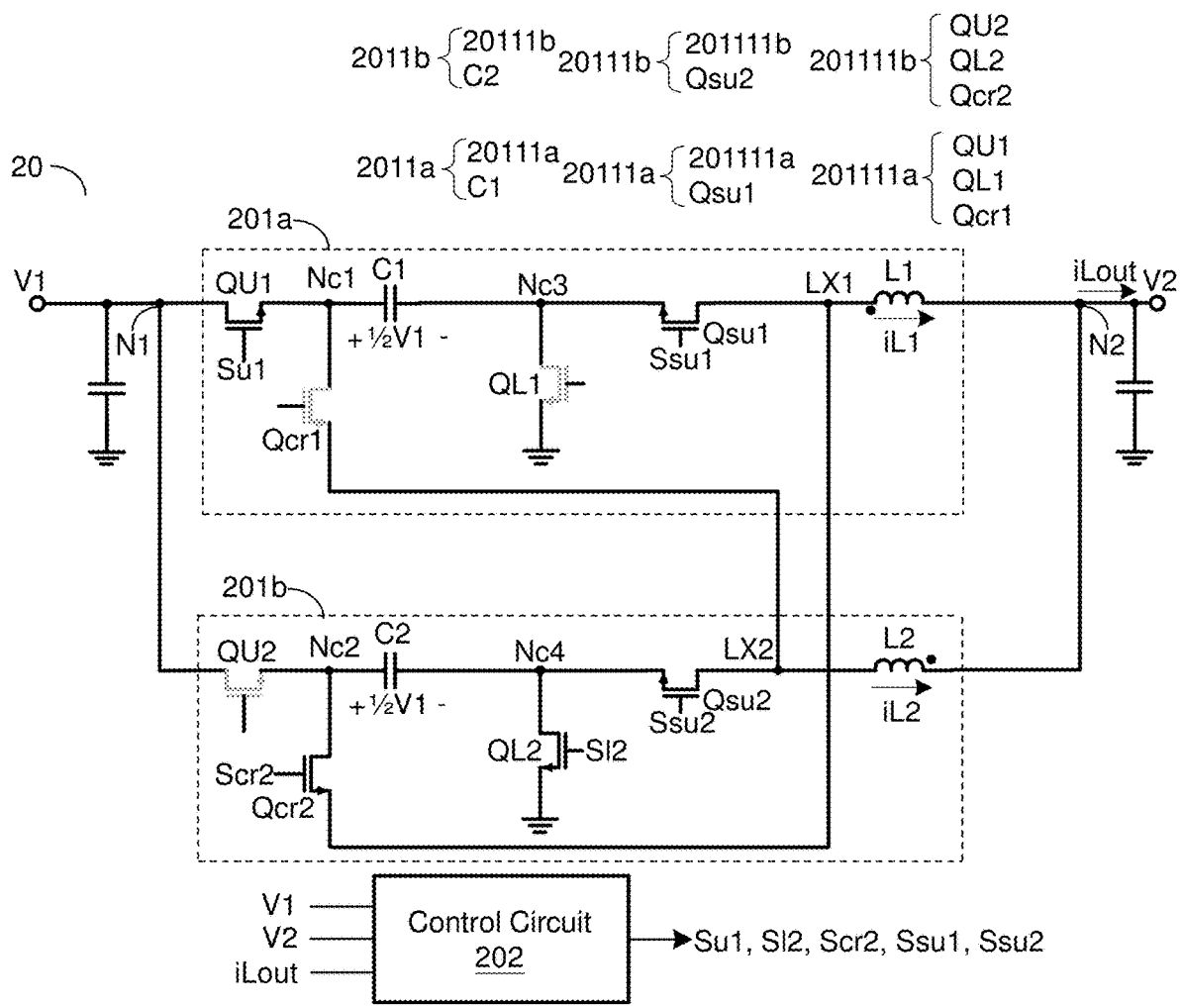

As shown in FIG. 2N and FIG. 3, within the eleventh electrical connection state S11, the high-side switch QU2, the low-side switch QL1 and the cross-over switch Qcr1 are switched to be OFF, and, the high-side switch QU1, the low-side switch QL2, the cross-over switch Qcr2, the subsidiary switch Qsu1 and the subsidiary switch Qsu2 are switched to be ON based upon the switching signals Su1, Sl2, Scr2, Ssu1 and Ssu2, respectively, with the inductor L1 and the inductor L2 being electromagnetically coupled to each other, such that the capacitor C1 and the capacitor C2 are electrically connected in series between the first voltage V1 and the reference potential (e.g., in this embodiment, the reference potential is a ground potential), with the inductor L1 being coupled between the switching node LX1 and the second voltage V2 and the inductor L2 being electrically coupled between the reference potential and the second voltage V2, thus charging the capacitor C1 and discharging the capacitor C2.

Figure 2O:
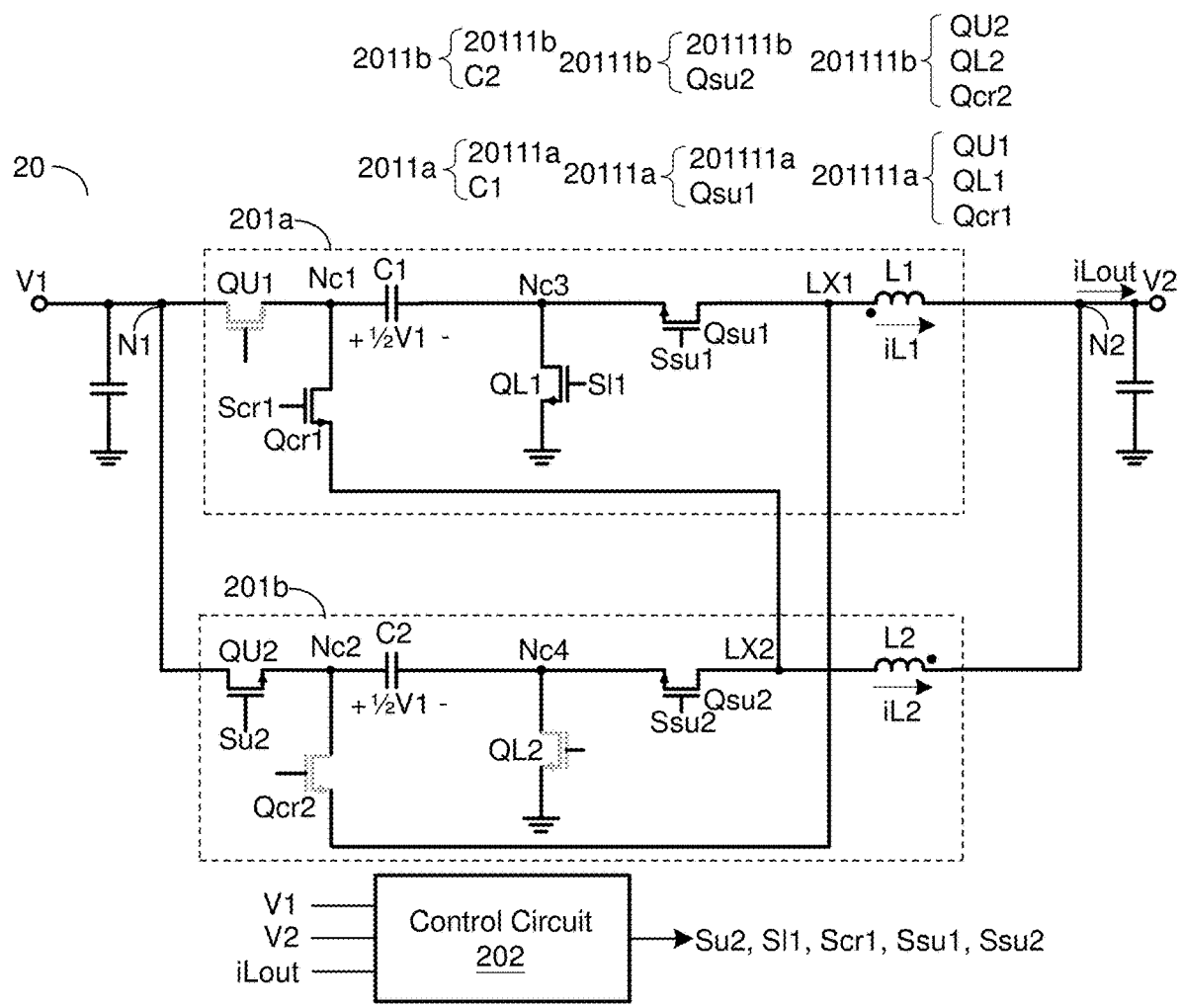

As shown in FIG. 2O and FIG. 3, within the twelfth electrical connection state S12, the high-side switch QU1, the low-side switch QL2 and the cross-over switch Qcr2 are switched to be OFF, and, the high-side switch QU2, the low-side switch QL1, the cross-over switch Qcr1, the subsidiary switch Qsu1 and the subsidiary switch Qsu2 are switched to be ON based upon the switching signals Su2, Sl1, Scr1, Ssu1 and Ssu2, respectively, with the inductor L1 and the inductor L2 being electromagnetically coupled to each other, such that the capacitor C1 and the capacitor C2 are electrically connected in series between the first voltage V1 and the reference potential (e.g., in this embodiment, the reference potential is a ground potential), with the inductor L2 being coupled between the switching node LX2 and the second voltage V2 and the inductor L1 being electrically coupled between the reference potential (e.g., in this embodiment, the reference potential is a ground potential) and the second voltage V2, thus charging the capacitor C2 and discharging the capacitor C1.

Figure 4:
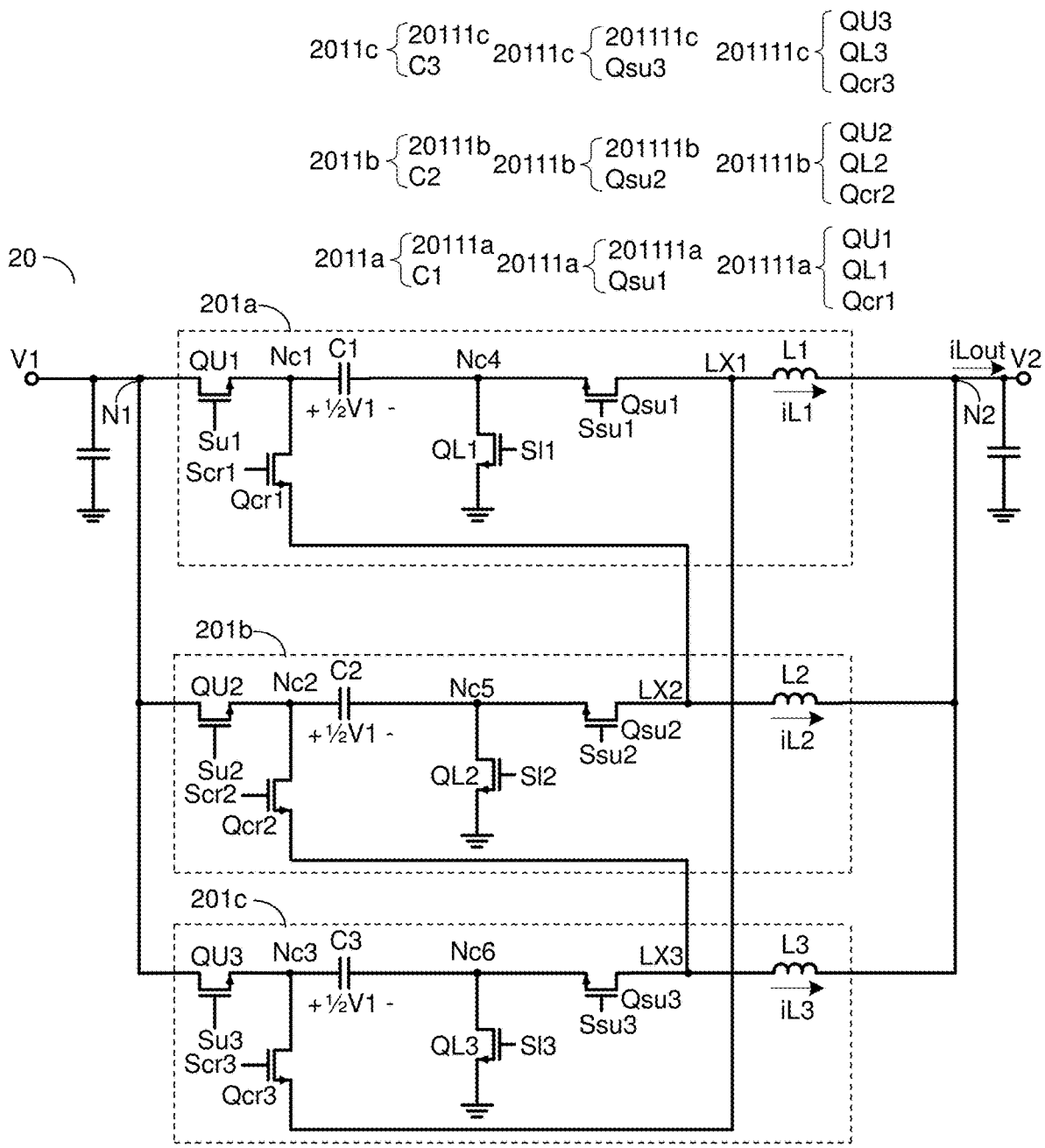
FIG. 4 shows a schematic circuit diagram of a multi-phase switching converter according to yet another exemplary embodiment of the present invention.

FIG. 4 shows a schematic circuit diagram of a multi-phase switching converter according to still another exemplary embodiment of the present invention. The multi-phase switching converter 20 of this embodiment shown in FIG. 4 is similar to the multi-phase switching converter 20 of the embodiment shown in FIG. 2A, but with differences described as the following. The multi-phase switching converter 20 of this embodiment shown in FIG. 4 includes three sub-switching converters 201a, 201b and 201c. It is worthwhile mentioning that, it should be understood that the implementation of the number for the sub-switching converter as "three" in the above-mentioned preferred embodiment is only an illustrative example, but not for limiting the broadest scope of the present invention. That is, the present invention is not limited by the number for the sub-switching converter shown in the above-mentioned preferred embodiment. In other embodiments, it is also practicable and within the broadest scope of the present invention that the implementation of the number for the sub-switching converter as any positive integer greater than one. In one embodiment, the plural sub-switching converters (i.e., sub-switching converter 201a, sub-switching converter 201b and sub-switching converter 201c) are arranged in a circular sequence. In one embodiment, based upon the circular sequence, two consecutively arranged sub-switching converters (e.g., sub-switching converter 201a and sub-switching converter 201b; or, sub-switching converter 201b and sub-switching converter 201c; or, sub-switching converter 201c and sub-switching converter 201a) are periodically switched between the plural electrical connection states, so as to respectively switch respective different combinations of a corresponding group of switching node (e.g., LX1 or LX2; LX2 or LX3; LX3 or LX1) between a divided voltage (e.g., ½*V1) and the reference potential, thereby performing the power conversion between the first voltage V1 and the second voltage V2. In one embodiment, the control circuit 202 shown in FIG. 4 can be implemented by the control circuit 202 shown in FIG. 2B or by the control circuit 202' shown in FIG. 2C.

Figure 5:
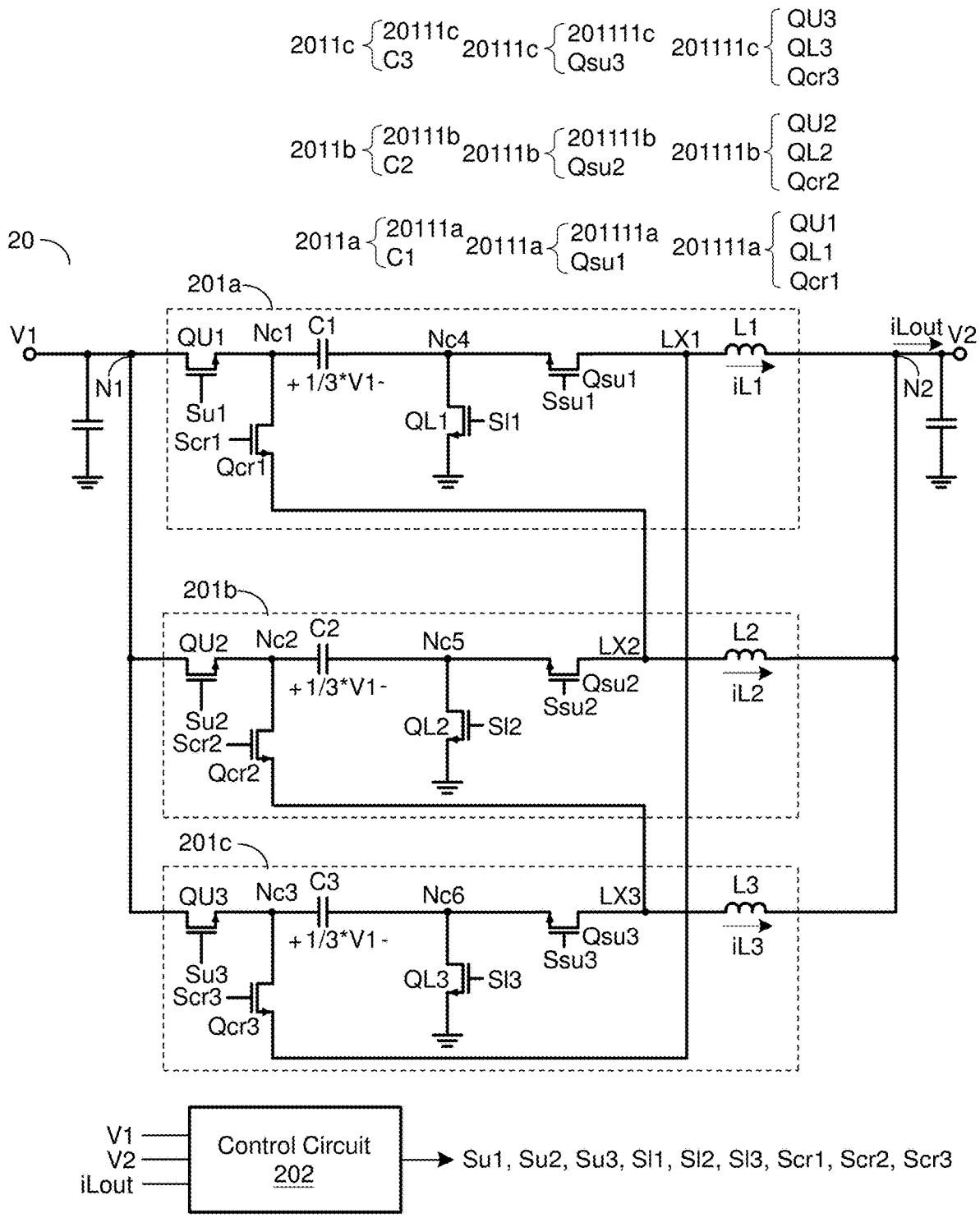
FIG. 5 shows a schematic circuit diagram of a multi-phase switching converter according to still another exemplary embodiment of the present invention.

FIG. 5 shows a schematic circuit diagram of a multi-phase switching converter according to still another exemplary embodiment of the present invention. The multi-phase switching converter 20 of this embodiment shown in FIG. 5 is similar to the multi-phase switching converter 20 of the embodiment shown in FIG. 4, but with differences described as the following. The multi-phase switching converter 20 of this embodiment shown in FIG. 5 is configured to periodically switch three consecutive sub-switching converters 201a, 201b and 201c. In one embodiment, a number for the sub-switching converters is equal to three. As a result, in this case, all the plural sub-switching converters (i.e., sub-switching converter 201a, sub-switching converter 201b and sub-switching converter 201c) are periodically switched between the plural electrical connection states consecutively based upon the circular sequence, so as to correspondingly switch all the switching nodes (i.e., LX1, LX2 and LX3) of all the sub-switching converters between a first divided voltage (e.g., ⅓*V1), a second divided voltage (e.g., ⅔*V1) and the reference potential (i.e. ground level), thereby performing the power conversion between the first voltage V1 and the second voltage V2. In one embodiment, the control circuit 202 shown in FIG. 5 can be implemented by the control circuit 202 shown in FIG. 2B or by the control circuit 202' shown in FIG. 2C.

Figure 6:
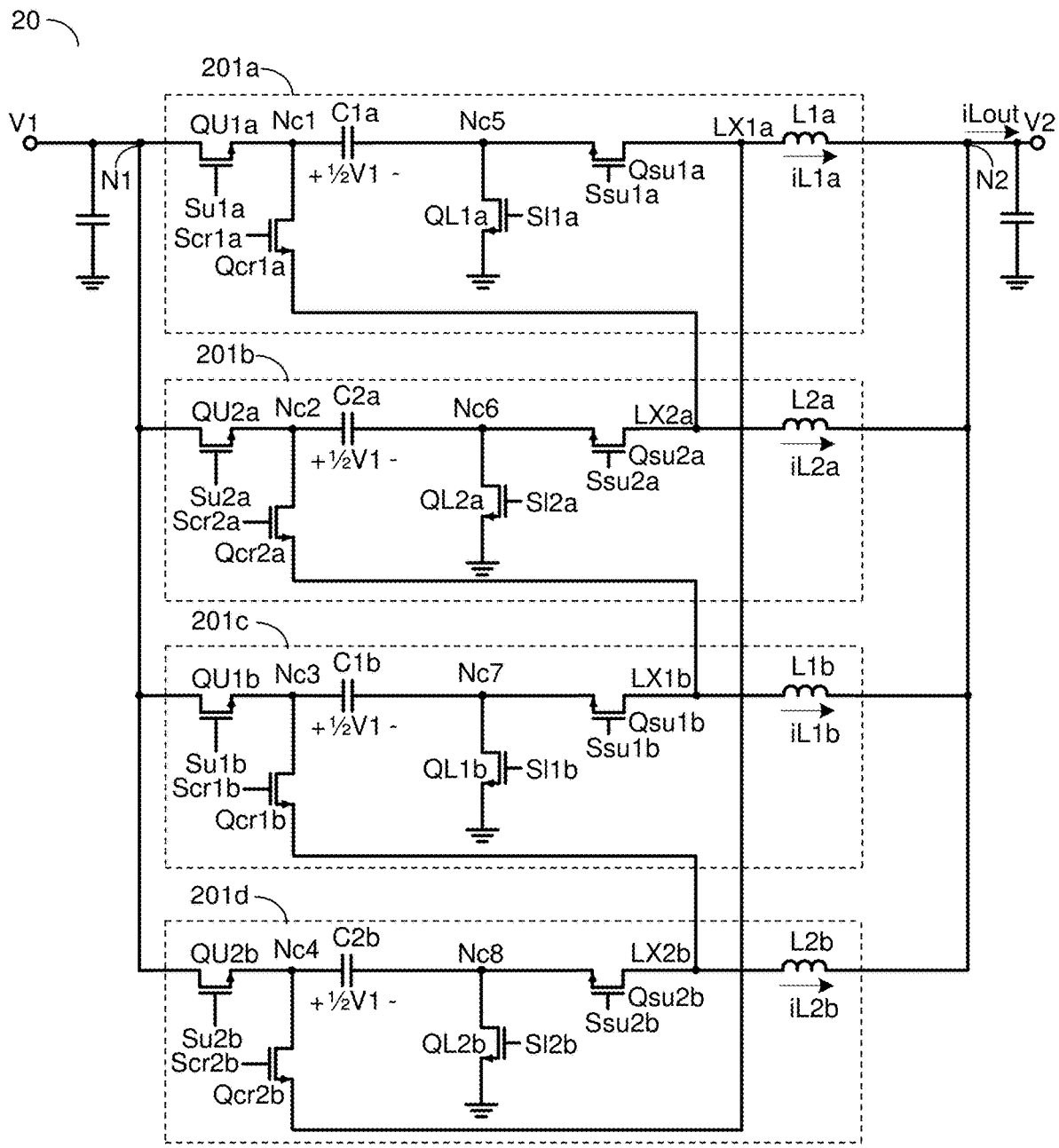
FIG. 6 shows a schematic circuit diagram of a multi-phase switching converter according to still another exemplary embodiment of the present invention.
Figure 6:
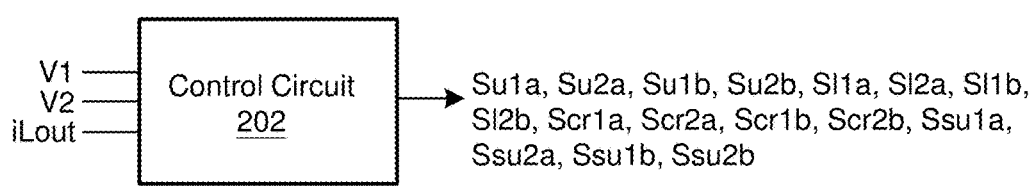

FIG. 6 shows a schematic circuit diagram of a multi-phase switching converter according to still another exemplary embodiment of the present invention. The multi-phase switching converter 20 of this embodiment shown in FIG. 6 is similar to the multi-phase switching converter 20 of the embodiment shown in FIG. 4, but with differences described as the following. The multi-phase switching converter 20 of this embodiment shown in FIG. 6 is implemented includes four sub-switching converters 201a, 201b, 201c and 201d. In one embodiment, the plural sub-switching converters (i.e., sub-switching converter 201a, sub-switching converter 201b, sub-switching converter 201c and sub-switching converter 201d) are arranged in an circular sequence, and every two of the consecutive sub-switching converters are periodically switched between the plural electrical connection states, so as to switch each corresponding pair of the switching nodes (e.g., LX1a and LX2a and LX1b and LX2b; or, LX2a and LX1b and LX2b and LX1b) between a divided voltage (e.g., ½*V1) and the reference potential, thereby performing the power conversion between the first voltage V1 and the second voltage V2. It is worthwhile mentioning that, in another embodiment, it is also practicable and within the broadest scope of the present invention that the all of the plural sub-switching converters (i.e., sub-switching converter 201a, sub-switching converter 201b, sub-switching converter 201c and sub-switching converter 201d) are periodically and consecutively switched between the plural electrical connection states, based upon the circular sequence, so as to correspondingly switch all the inductor switching nodes (i.e., LX1a, LX2a, LX1b and LX2b) of all the sub-switching converters between a first divided voltage (e.g., ¼*V1), a second divided voltage (e.g., ²⁄₄*V1), and a third divided voltage (e.g., ¾*V1) and the reference potential, thereby performing the power conversion between the first voltage V1 and the second voltage V2. In one embodiment, the control circuit 202 shown in FIG. 6 can be implemented by the control circuit 202 shown in FIG. 2B or by the control circuit 202' shown in FIG. 2C.

Figure 7:
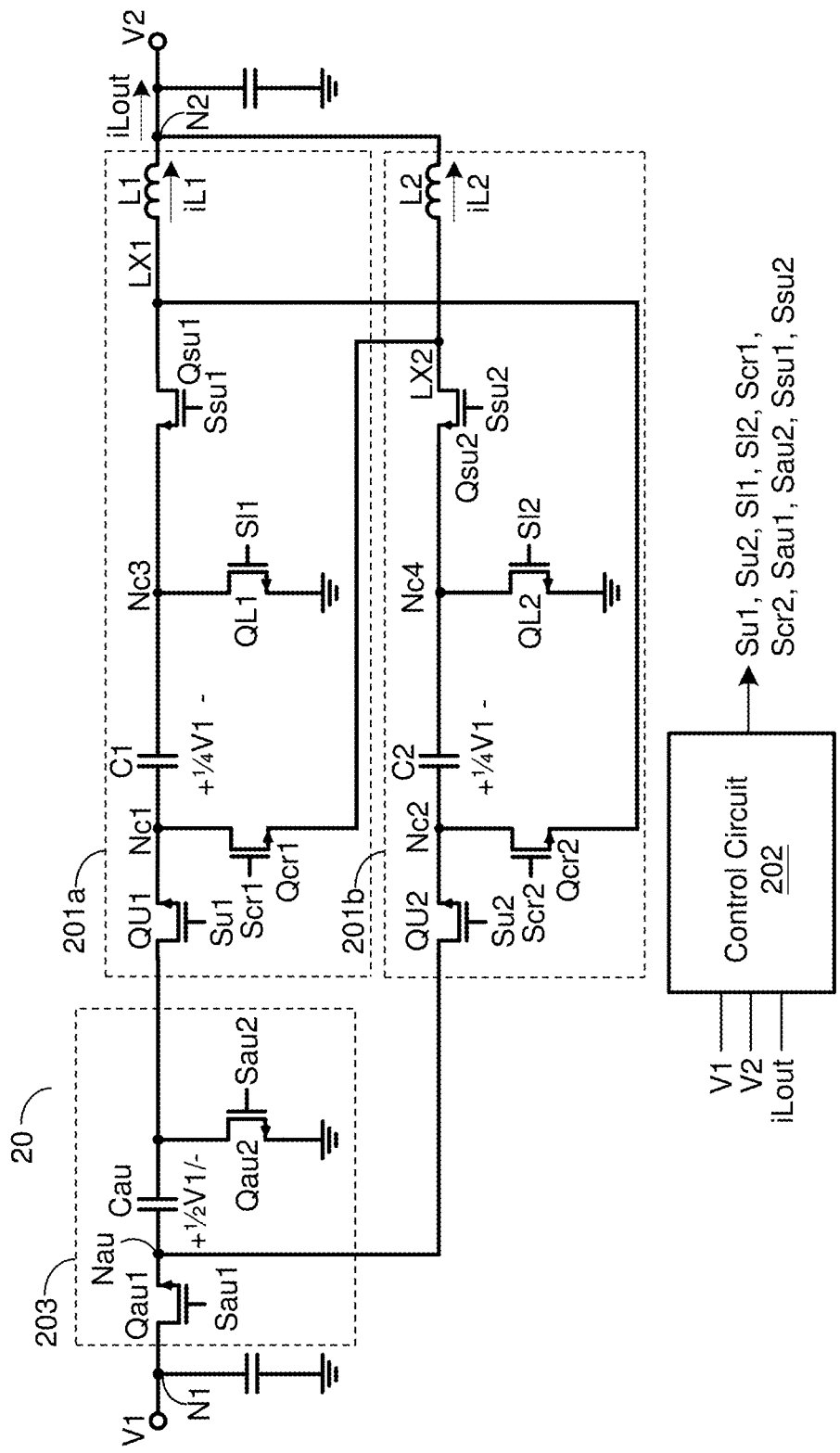
FIG. 7 shows a schematic circuit diagram of a multi-phase switching converter according to still another exemplary embodiment of the present invention.

FIG. 7 shows a schematic circuit diagram of a multi-phase switching converter according to still another exemplary embodiment of the present invention. The multi-phase switching converter 20 of this embodiment shown in FIG. 7 is similar to the multi-phase switching converter 20 of the embodiment shown in FIG. 2A, but with differences as the following. The multi-phase switching converter 20 of this embodiment shown in FIG. 7 further includes: an auxiliary switched capacitor circuit 203. The auxiliary switched capacitor circuit 203 is coupled to a sub-switching converter 201a and sub-switching converter 201b. As shown in FIG. 7, the auxiliary switched capacitor circuit 203 includes: an auxiliary capacitor Cau and plural auxiliary switches (e.g., auxiliary switches Qau1 and Qau2). In addition to generating switching signals (e.g., switching signals Su1, Su2, Sl1, Sl2, Scr1, Scr2, Ssu1 and Ssu2), the control circuit 202 is further configured to operably generate plural auxiliary switching signals (e.g., auxiliary switching signals Sau1 and Sau2), so as to correspondingly control the plural corresponding auxiliary switches (e.g., auxiliary switches Qau1 and Qau2) of the auxiliary switched capacitor circuit 203, in conjunction with controlling the plural corresponding switches (e.g., switches QUl, QL1 and Qcr1) in the sub-switching converter 201a and the plural corresponding switches (e.g., switches QU2, QL2 and Qcr2) in the sub-switching converter 201b. Consequently, the auxiliary capacitor Cau, the sub-switching converter 201a and the sub-switching converter 201b are periodically switched between a first auxiliary electrical connection state and a second auxiliary electrical connection state to thereby perform the switched capacitor switching on the first voltage V1, so that a bias voltage across the auxiliary capacitor Cau is regulated at an auxiliary divided voltage of the first voltage V1. In one embodiment, the control circuit 202 shown in FIG. 7 can be implemented by the control circuit 202 shown in FIG. 2B' or by the control circuit 202 shown in FIG. 2C.

Within the first auxiliary electrical connection state, the auxiliary switch Qau2, the high-side switch QU2, the subsidiary switch Qsu2, the cross-over switch Qcr1 and the low-side switch QL1 are switched to be ON, and, the auxiliary switch Qau1, the high-side switch QU1, the subsidiary switch Qsu1, the cross-over switch Qcr2 and the low-side switch QL2 are switched to be OFF, such that a series connection of the capacitor C1 of the sub-switching converter 201a and the capacitor C2 of the sub-switching converter 201b is electrically connected in parallel with the auxiliary capacitor Cau between an auxiliary switching node Nau inside the auxiliary switched capacitor circuit 203 and the reference potential.

Within the second auxiliary electrical connection state, the auxiliary switch Qau1, the high-side switch QU1, the subsidiary switch Qsu1, the cross-over switch Qcr2 and the low-side switch QL2 are switched to be ON, and, the auxiliary switch Qau2, the high-side switch QU2, the subsidiary switch Qsu2, the cross-over switch Qcr1 and the low-side switch QL1 are switched to be OFF, such that a series connection of the capacitor C1 of the sub-switching converter 201a and the capacitor C2 of the sub-switching converter 201b is electrically connected in series with the auxiliary capacitor Cau between the first power node N1 and the reference potential.

Figure 8:
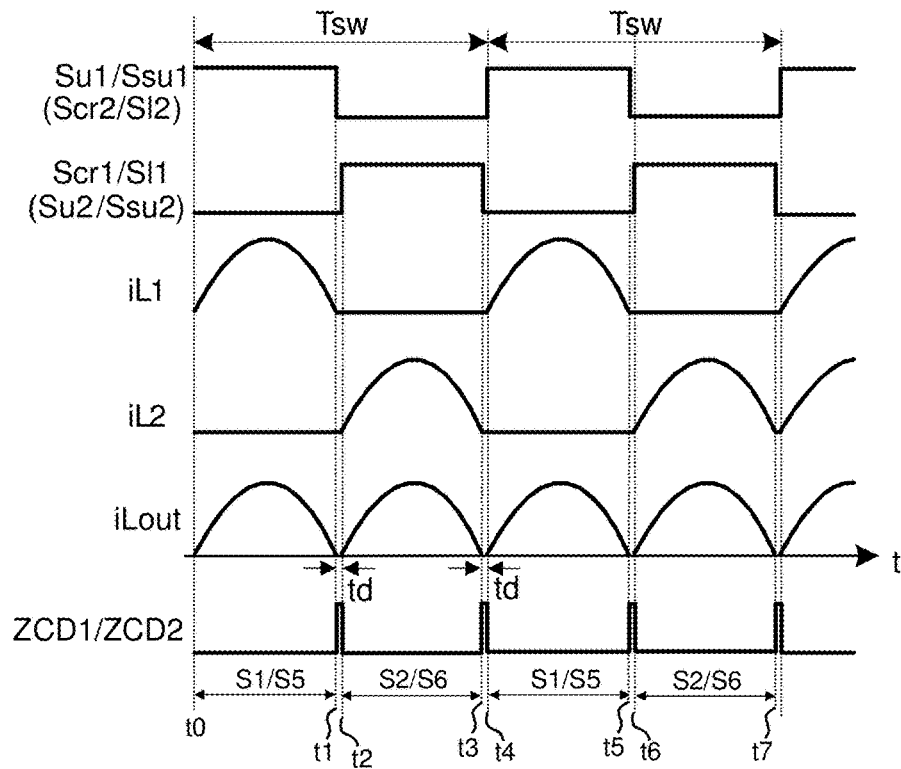
FIG. 8 illustrates signal waveform diagrams depicting signals associated with the operation of a multi-phase switching converter of FIG. 2A according to an exemplary embodiment of the present invention.

FIG. 8 illustrates signal waveform diagrams depicting signals associated with the operation of a multi-phase switching converter of FIG. 2A according to an exemplary embodiment of the present invention. The switching signals Su1, Ssu1, Scr1, Sl1, Su2, Ssu2, Scr2 and Sl2, the inductor currents iL1 and iL2, an output inductor current iLout and a switching period Tsw are explicitly illustrated in FIG. 8. As shown in FIG. 8, in one embodiment, within a witching period Tsw, an order of the plural electrical connection states in this embodiment is sequentially arranged as the following: the first electrical connection state S1 (i.e., t0-t1 in FIG. 8) is followed by the second electrical connection state S2 (i.e., as shown by an interval ranging from a timing point t2-t3 in FIG. 8), which form a switching period Tsw. Subsequently, a next first electrical connection state S1 (i.e., t4-t5 in FIG. 8) is followed by a next second electrical connection state S2 (i.e., t6-t7 in FIG. 8), thus repeating the switching period Tsw. Note that, the first electrical connection state S1 is elaborated in the FIG. 2D, and, the second electrical connection state S2 is elaborated in the FIG. 2E. As shown in FIG. 8, in an alternative embodiment, an order of the plural electrical connection states in this embodiment is sequentially arranged as the following: the fifth electrical connection state S5 (i.e., t0-t1 in FIG. 8) is followed by the sixth electrical connection state S6 (i.e., t2-t3 in FIG. 8). Subsequently, a next fifth electrical connection state S5 (i.e., t4-t5 in FIG. 8) is followed by a next sixth electrical connection state S6 (i.e., t6-t7 in FIG. 8), thus repeating the switching period Tsw. Note that, the fifth electrical connection state S5 is elaborated in the FIG. 2H, and, the sixth electrical connection state S6 is elaborated in the FIG. 2I.

Please refer to FIG. 8 along with FIG. 2A, FIG. 2B and FIG. 3. When the multi-phase switching converter 20 operates in a resonant mode, once the control circuit 202 (referring to FIG. 2B) detects that the inductor current iL1 flowing through the corresponding inductor L1 reaches a zero current and/or an inductor current iL2 flowing through the corresponding inductor L2 reaches a zero current, the control circuit 202 is configured to operably generate a zero current detection signal ZCD1 corresponding to the inductor current iL1 and/or a zero current detection signal ZCD2 corresponding to the inductor current iL2, for switching the corresponding switches QU1, QL1, Qcr1, Qsu1, QU2, QL2, Qcr2 and Qsu2, thereby accomplishing a zero-current switching.

It is worthwhile mentioning that, in the embodiment shown in FIG. 8, within the switching period Tsw, in addition to the implementation where the order of the plural electrical connection states is embodied as being sequentially arranged as the first electrical connection state S1 followed by the second electrical connection state S2, or as the fifth electrical connection state S5 followed by the sixth electrical connection state S6, it is also alternatively practicable that an order of the plural electrical connection states is embodied as being sequentially arranged as the first electrical connection state S1 followed by the sixth electrical connection state S6 or as the fifth electrical connection state S5 followed by the second electrical connection state S2.

Figure 9:
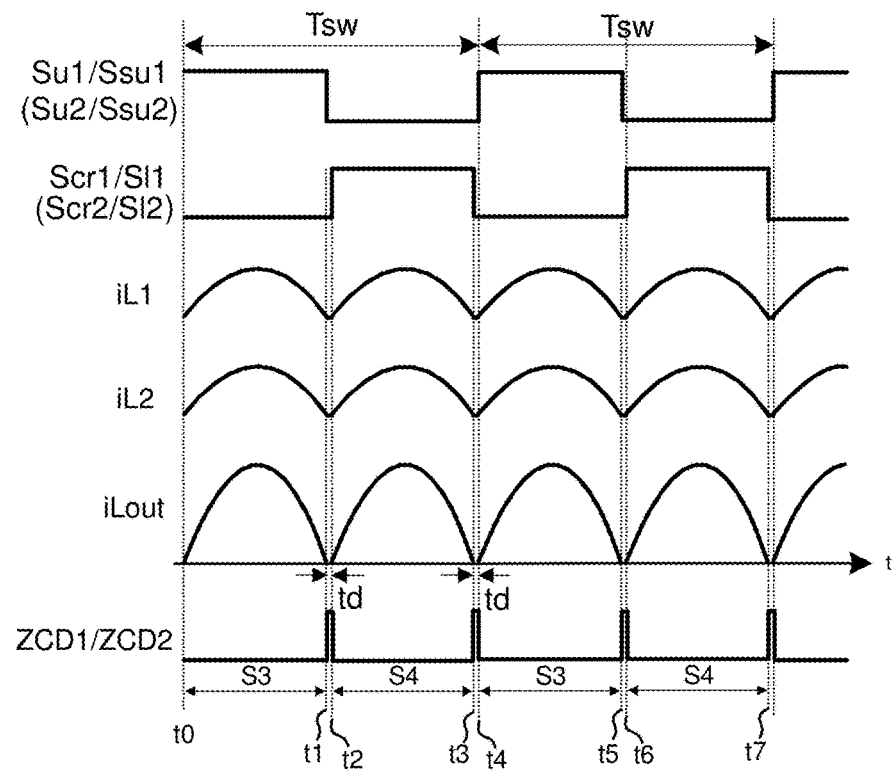
FIG. 9 illustrates signal waveform diagrams depicting signals associated with the operation of a multi-phase switching converter of FIG. 2A according to another exemplary embodiment of the present invention.

FIG. 9 illustrates signal waveform diagrams depicting signals associated with the operation of a multi-phase switching converter of FIG. 2A according to another exemplary embodiment of the present invention. The switching signals Su1, Ssu1, Scr1, Sl1, Su2, Ssu2, Scr2 and Sl2, the inductor currents iL1 and iL2, an output inductor current iLout, zero current detection signals ZCD1 and ZCD2 and a switching period Tsw are explicitly illustrated in FIG. 9. As shown in FIG. 9, in one embodiment, within a witching period Tsw, an order of the plural electrical connection states in this embodiment is sequentially arranged as the third electrical connection state S3 (i.e., t0-t1 in FIG. 9) followed by the fourth electrical connection state S4 (i.e., t2-t3 in FIG. 9), thus repeating the switching period Tsw (such as t4-t5 and t5-t6). Note that, the third electrical connection state S3 is elaborated in the FIG. 2F, and, the fourth electrical connection state S4 is elaborated in the FIG. 2G. Please refer to FIG. 9 along with FIG. 2A, FIG. 2B and FIG. 3. When the multi-phase switching converter 20 operates in a resonant mode, the zero-current switching can be achieved similarly by the control circuit 202 (referring to FIG. 2B) as described in the embodiment of FIG. 8. In the embodiments shown in FIG. 9 or FIG. 8, because a switching frequency is related to a resonant frequency, the multi-phase switching converter 20 operates in a resonant mode, so as to control a voltage ratio of the second voltage V2 to the first voltage V1 to become correlated with: (1) a ratio of the first divided voltage to the first voltage V1 or (2) a ratio of the second divided voltage to the first voltage V1. Note that, the resonant frequency is related to a capacitance of the capacitor C1 and an inductance of the inductor L1, or is related to a capacitance of the capacitor C2 and an inductance of the inductor L2.

Figure 10:
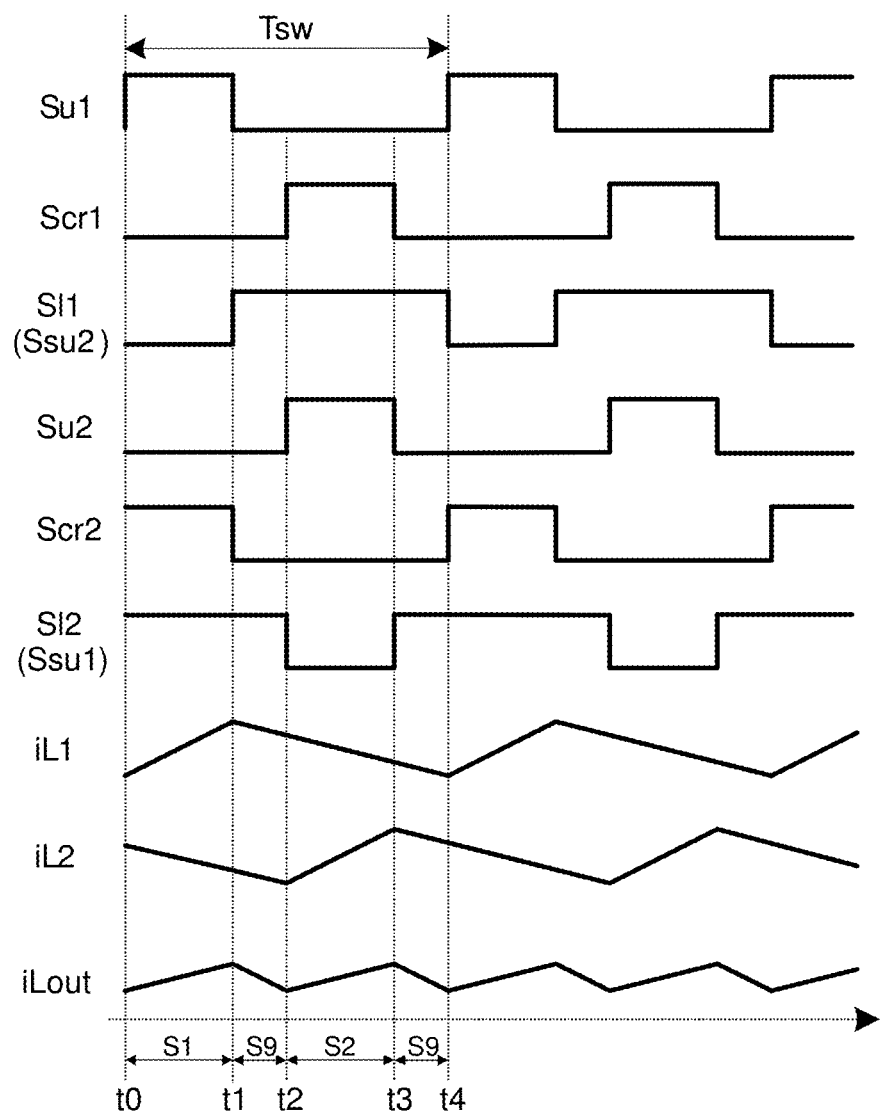
FIG. 10 illustrates signal waveform diagrams depicting signals associated with the operation of a multi-phase switching converter of FIG. 2A according to yet another exemplary embodiment of the present invention.

FIG. 10 illustrates signal waveform diagrams depicting signals associated with the operation of a multi-phase switching converter of FIG. 2A according to yet another exemplary embodiment of the present invention. The switching signals Su1, Ssu1, Scr1, Sl1, Su2, Ssu2, Scr2 and Sl2, the inductor currents iL1 and iL2, an output inductor current iLout and a switching period Tsw are explicitly illustrated in FIG. 10. As shown in FIG. 10, within a witching period Tsw, an order of the plural electrical connection states in this embodiment is sequentially arranged as the first electrical connection state S1 (i.e., t0-t1 in FIG. 10) followed by the ninth electrical connection state S9 (i.e., t1-t2 in FIG. 10), the second electrical connection state S2 (i.e., t2-t3 in FIG. 10) and again the ninth electrical connection state S9 (i.e., t3-t4 in FIG. 10). Note that, S1 and S2 are elaborated in the FIG. 2D and FIG. 2E, and, S9 is elaborated in the FIG. 2L. Note that, in this embodiment shown in FIG. 10, because a switching frequency is not related to a resonant frequency (e.g., far higher than the resonant frequency), the multi-phase switching converter 20 of this embodiment operates in a non-resonant mode.

It is worthwhile noting that, in the embodiment shown in FIG. 10, within the first electrical connection state S1 (i.e., t0-t1 in FIG. 10), the inductor current iL2 is freewheeled to ramp down through the low-side switch QL2 (ON as shown in FIG. 2D) and the body diode of the subsidiary switch Qsu2 (Qsu2 OFF as shown FIG. 2D). On the other hand, within the second electrical connection state S2 (i.e., t2-t3 in FIG. 10), the inductor currents iL1 is freewheeled to ramp down through the body diode of the low-side switch QL1 (QL1 OFF as shown in FIG. 2D) and the subsidiary switch Qsu1 (ON as shown in FIG. 2D).

Figure 11:
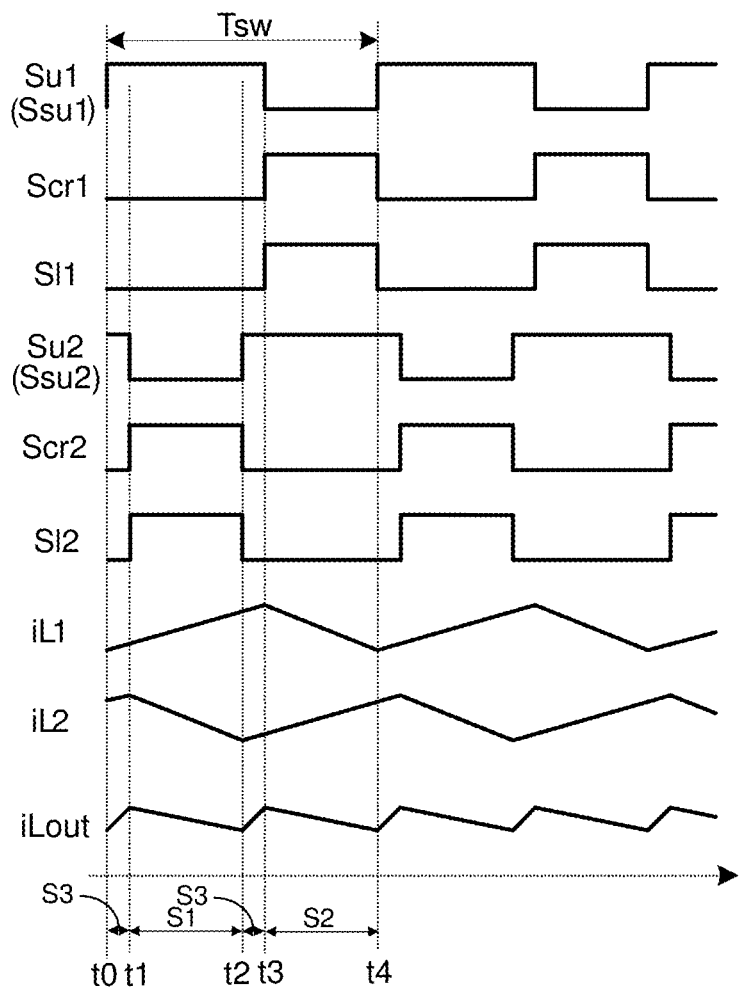
FIG. 11 illustrates signal waveform diagrams depicting signals associated with the operation of a multi-phase switching converter of FIG. 2A according to still another exemplary embodiment of the present invention.

FIG. 11 illustrates signal waveform diagrams depicting signals associated with the operation of a multi-phase switching converter of FIG. 2A according to still another exemplary embodiment of the present invention. The switching signals Su1, Ssu1, Scr1, Sl1, Su2, Ssu2, Scr2 and Sl2, the inductor currents iL1 and iL2, an output inductor current iLout and a switching period Tsw are explicitly illustrated in FIG. 11. As shown in FIG. 11, within a witching period Tsw, an order of the plural electrical connection states in this embodiment is sequentially arranged as the third electrical connection state S3 (i.e., t0-t1 in FIG. 11) followed by the first electrical connection state S1 (i.e., t1-t2 in FIG. 11), the third electrical connection state S3 (i.e., t2-t3 in FIG. 11) and the second electrical connection state S2

(i.e., t3-t4 in FIG. 11). Note that, in the aforesaid implementation of the switching period Tsw, S1, S2 and S3 are elaborated in the FIG. 2D, FIG. 2E and FIG. 2F. Note that, in the embodiments shown in FIG. 11 and FIG. 10, the switching frequency is far greater than a resonant frequency to an extent that the multi-phase switching converter operates in a non-resonant mode, and the second voltage V2 is regulated at a preset level or the first voltage V1 is regulated at another preset level. Note that, the resonant frequency is related to a capacitance of the capacitor C1 and an inductance of the inductor L1, or related to a capacitance of the capacitor C2 and a inductance of the inductor L2.

Figure 12:
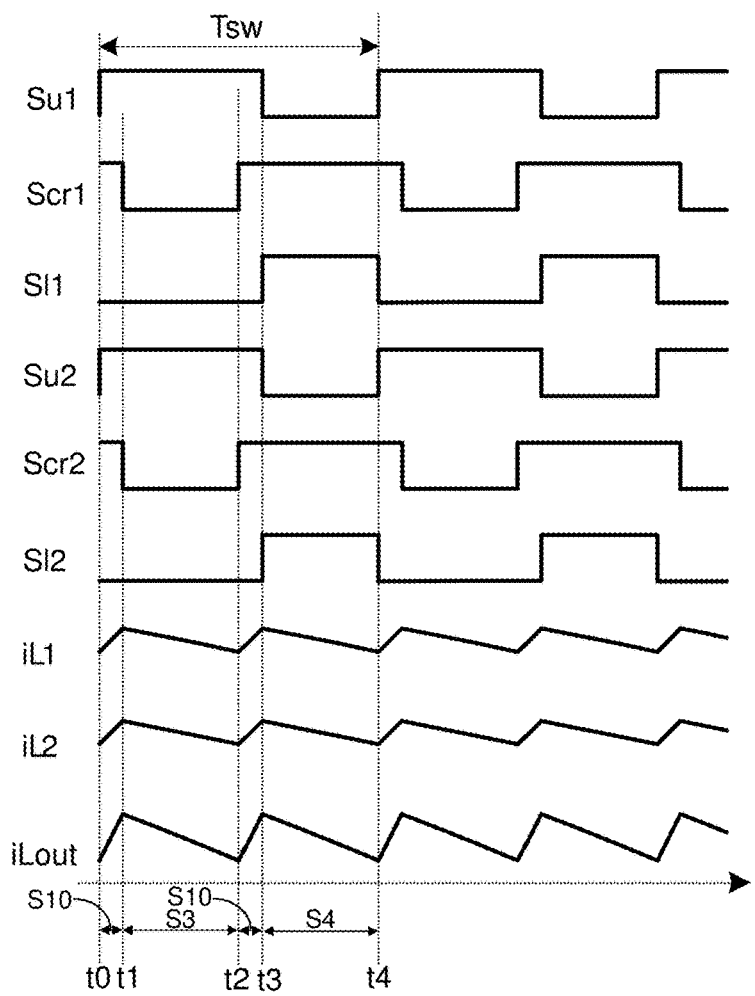
FIG. 12 illustrates signal waveform diagrams depicting signals associated with the operation of a multi-phase switching converter of FIG. 2A according to still another exemplary embodiment of the present invention.

FIG. 12 illustrates signal waveform diagrams depicting signals associated with the operation of a multi-phase switching converter of FIG. 2A according to still another exemplary embodiment of the present invention. The switching signals Su1, Ssu1, Scr1, Sl1, Su2, Ssu2, Scr2 and Sl2, the inductor currents iL1 and iL2, an output inductor current iLout and a switching period Tsw are explicitly illustrated in FIG. 12. As shown in FIG. 12, within a witching period Tsw, an order of the plural electrical connection states in this embodiment is sequentially arranged as the tenth electrical connection state S10 (i.e., t0-t1 in FIG. 12) followed by the third electrical connection state S3 (i.e., t1-t2 in FIG. 12), the tenth electrical connection state S10 (i.e., t2-t3 in FIG. 12) and the fourth electrical connection state S4 (i.e., t3-t4 in FIG. 12). Note that, in the aforesaid implementation of the switching period Tsw, S10, S3 and S4 are elaborated in FIG. 2M, FIG. 2F and FIG. 2G.

It is noteworthy that, the waveforms shown in FIG. 8 to FIG. 12 are respectively exemplary embodiments according to the present invention. Nevertheless, it should be understood that the above-mentioned embodiments shown in FIG. 8 to FIG. 12 are only illustrative examples, but not for limiting the broadest scope of the present invention. In other embodiments, it is also practicable and within the broadest scope of the present invention that: according to the present invention, within a switching period Tsw, the inductor L1 and the inductor L2 are switched between at least two electrical connection states among for example the first electrical connection state S1 to the twelfth electrical connection state S12 listed in FIG. 3, so that the capacitor C1 and the capacitor C2 can perform switched capacitor switching on the first voltage V1, thus switching the switching node LX1 between a first divided voltage and a first reference potential and thus switching the switching node LX2 between a second divided voltage and a second reference potential, respectively, thereby performing the power conversion between the first power node N1 and the second power node N2.

To be more specific, within a switching period Tsw, in addition to state combinations shown in FIG. 8 to FIG. 12, other combinations of switching states, such as a combination S7 and S8, or S11 and S12 within a switching period Tsw are also alternatively applicable.

Figure 13:
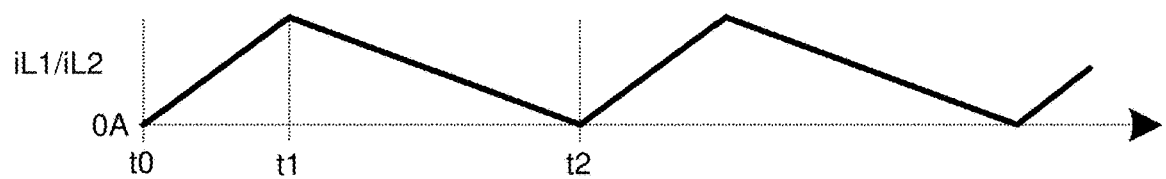
FIG. 13 to FIG. 16 illustrate signal waveform diagrams depicting signals associated with the operation of a multi-phase switching converter of FIG. 2A according to several different exemplary embodiments of the present invention.

FIG. 13 to FIG. 16 illustrate signal waveform diagrams depicting signals associated with the operation of a multi-phase switching converter of FIG. 2A according to several different exemplary embodiments of the present invention. Please refer to FIG. 13 along with FIG. 2A. In accordance with a load level, the control circuit 202 is configured to operably generate the corresponding switching signals Su1, Su2, Sl1, Sl2, Scr1, Scr2 Ssu1 and Ssu2 for switching the corresponding switches QU1, QU2, QL1, QL2, Qcr1, Qcr2, Qsu1 and Qsu2 respectively for switching the corresponding electrical connection states, so as to control the plural sub-switching converters 201a and 201b to operate in a boundary conduction mode (BCM). As shown in FIG. 13, each corresponding switch (indicating the switches as mentioned above in this paragraph) is switched at a zero current time point where the inductor current iL1 or the inductor current iL2 is zero, thus accomplishing a soft switching of a zero-current switching (ZCS).

Figure 14:
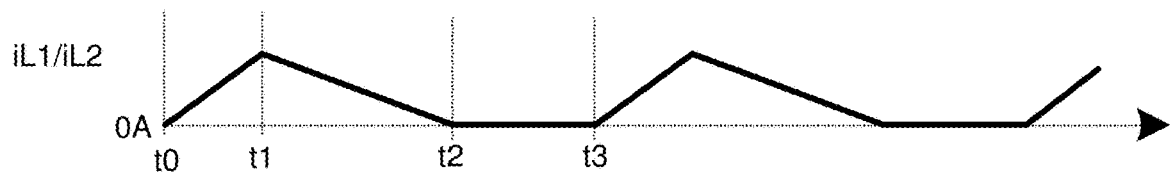
Figure 15:
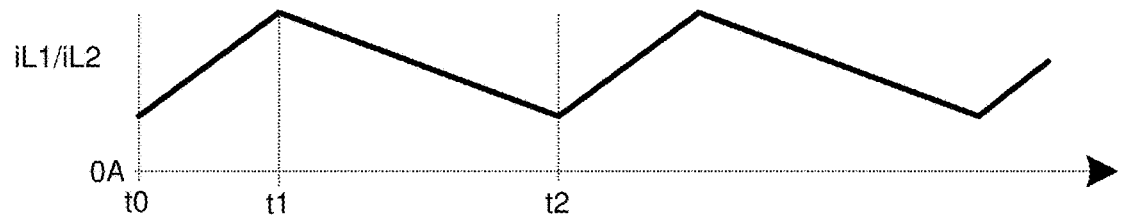

Please refer to FIG. 14 along with FIG. 2A. In accordance with a load level, the control circuit 202 is configured to operably control the corresponding switches as listed above for switching the corresponding electrical connection states, so as to control the plural sub-switching converters 201a and 201b to operate in a discontinuous conduction mode (DCM). Please refer to FIG. 15 along with FIG. 2A. In accordance with a load level, the control circuit 202 is configured to operably control the corresponding switches as listed above for switching the corresponding electrical connection states, so as to control the plural sub-switching converters 201a and 201b to operate in a continuous conduction mode (CCM).

Figure 16:
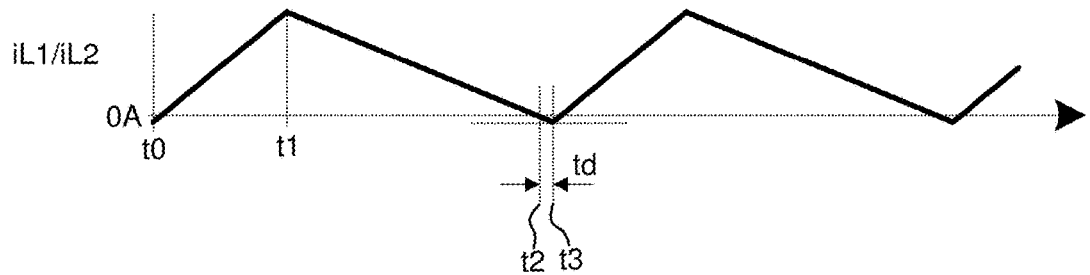
Figure 17:
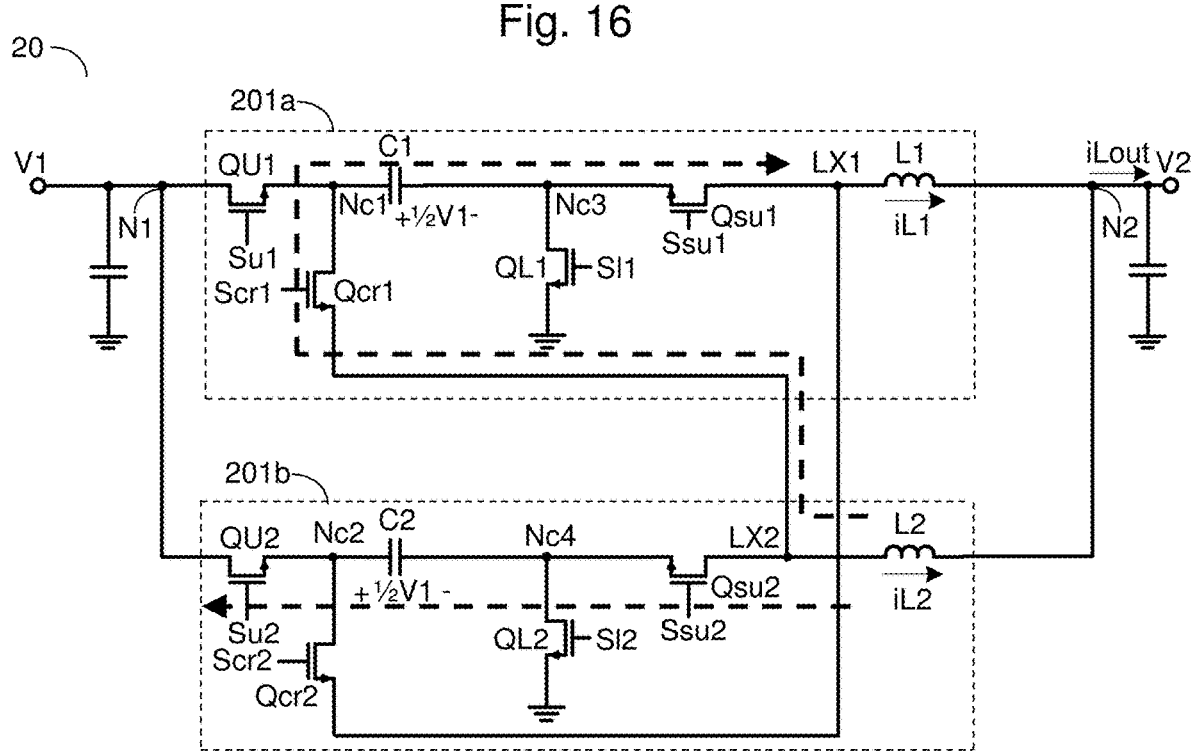
FIG. 17 is a schematic circuit diagram and a schematic operation diagram of an exemplary multi-phase switching converter according to an exemplary embodiment of the present invention.

FIG. 17 is a schematic circuit diagram and a schematic operation diagram of an exemplary multi-phase switching converter according to an exemplary embodiment of the present invention. Please refer to FIG. 16 along with FIG. 17. Please refer to FIG. 16 along with FIG. 17. After the inductor L1 or L2 is demagnetized and thus the inductor current iL1 or iL2 flowing through the corresponding inductor L1 or L2 reaching a zero current, until waiting for a delay time td (i.e., t2-t3 in FIG. 16), corresponding switches are then switched to enter another state (e.g., from t3 as shown in FIG. 16). As an example, shown in FIG. 17, the inductor current iL2 in a reversed direction will flow along a path (illustrated as a thick dashed lines in FIG. 17) to the first voltage V1 or to the second voltage V2 achieves a soft switching of a zero-voltage switching (ZVS). More specifically, the reverse current is able to recycle the energy across the switches QU2 and Qcr1 and to turn on body diodes of the switches QU2 and Qcr1. Then, the switches for magnetizing the iL2 are turned on after t3 (FIG. 16) with a specific dead-time, thus achieving soft-switching of zero voltage switching (ZVS) by the switching control scheme.

As fully elaborated above, advantages of the multi-phase switching converter provided by the present invention include: greater power conversion efficiency, smaller inductors, lower voltage stress on the components within the multi-phase switching converter, more capable of mitigating EMI and lower power loss by resonant operation having a zero-current switching.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A multi-phase switching converter, which is configured to perform a power conversion between a first voltage at a first power node and a second voltage at a second power node; the multi-phase switching converter comprising:
   a plurality of sub-switching converters, wherein the plurality of sub-switching converters includes:
   a first sub-switching converter which includes: a first switched capacitor power conversion circuit and a first inductor connected in series to each other, wherein the first switched capacitor power conversion circuit is coupled between the first power node and a first switching node, and the first switched capacitor power conversion circuit includes: a first switch circuit and a first capacitor, wherein the first inductor is coupled between the second power node and the first switching node;
   a second sub-switching converter which includes: a second switched capacitor power conversion circuit and a second inductor connected in series to each other, wherein the second switched capacitor power conversion circuit is coupled between the first power node and a second switching node, and the second switched capacitor power conversion circuit includes: a second switch circuit and a second capacitor, wherein the second inductor is coupled between the second power node and the second switching node; and
   a control circuit, which is configured to generate a plurality of switching signals;
   wherein, according to the plurality of switching signals, the first switch circuit and the second switch circuit are configured to periodically switch the first inductor and the second inductor based on a switching frequency between a plurality of corresponding electrical connection states, respectively;
   wherein the plurality of switching signals are configured to switch the first capacitor and the second capacitor between the plurality of electrical connection states to obtain a first divided voltage and a second divided voltage by dividing the first voltage through switched capacitor switching, so as to switch the first switching node between the first divided voltage and a first reference potential and so as to switch the second switching node between the second divided voltage and a second reference potential, respectively, thereby performing the power conversion between the first power node and the second power node;
   wherein the first reference potential is correlated with the first voltage, a divided voltage of the first voltage, a ground potential, a voltage across the first capacitor, or a voltage across the second capacitor, and, the second reference potential is correlated with the first voltage, the divided voltage of the first voltage, the ground potential, the voltage across the first capacitor, or the voltage across the second capacitor;
   wherein the first switch circuit has a plurality of first switches and a first subsidiary switch, wherein the first subsidiary switch is coupled between the first capacitor and the first switching node, and the first subsidiary switch is configured to electrically connect the first capacitor and the first inductor in accordance with a corresponding one of the plurality of switching signals;
   wherein the second switch circuit has a plurality of second switches and a second subsidiary switch, wherein the second subsidiary switch is coupled between the second capacitor and the second switching node, and the second subsidiary switch is configured to electrically connect the second capacitor and the second inductor in accordance with a corresponding one of the plurality of switching signals;
   wherein the plurality of first switches includes:
   a first high-side switch, which is coupled between the first power node and the first capacitor;
   a first low-side switch, which is coupled between a third capacitor switching node and the first reference potential, the first capacitor and the first subsidiary switch are jointly coupled to the third capacitor switching node; and
   a first cross-over switch, which is coupled between a first capacitor switching node and the second switching node, wherein the first high-side switch and the first capacitor are jointly coupled to the first capacitor switching node; and
   wherein the plurality of second switches includes:
   a second high-side switch, which is coupled between the first power node and the second capacitor;
   a second low-side switch, which is coupled between a fourth capacitor switching node and the second reference potential, wherein the second capacitor and the second subsidiary switch are jointly coupled to the fourth capacitor switching node; and
   a second cross-over switch, which is coupled between a second capacitor switching node and the first switching node, wherein the second high-side switch and the second capacitor are jointly coupled to the second capacitor switching node; and
   wherein subsequent to the first inductor or the second inductor being demagnetized and subsequent to a first inductor current flowing through the first inductor reaching a zero current or a second inductor current flowing through the second inductor reaching a zero current, after waiting for a delay time, the control circuit is configured to switch the plurality of first switches or the plurality of second switches, thereby switching the corresponding electrical connection state.

2. The multi-phase switching converter as claimed in claim 1, wherein the first inductor current flowing through the first inductor and the second inductor current flowing through the second inductor are not in-phase and have a non-zero phase difference to each other.

3. The multi-phase switching converter as claimed in claim 1, wherein the plurality of sub-switching converters are arranged in a circular sequence, and the first sub-switching converter and second sub-switching converter are periodically and consecutively switched between the plurality of electrical connection states, so as to switch the first switching node between a divided voltage equal to a half of the first voltage and the first reference potential and so as to switch the second switching node between the divided voltage equal to the half of the first voltage and the second reference potential, thereby performing the power conversion between the first voltage and the second voltage.

4. The multi-phase switching converter as claimed in claim 1, wherein a number of the plurality of sub-switching converters is equal to N, wherein all of the plurality of sub-switching converters are periodically and consecutively switched between the plurality of the electrical connection states based on a circular sequence, so as to correspondingly and respectively switch all plurality of switching nodes of all the sub-switching converters between a divided voltage equal to 1/N of the first voltage and the first or second reference potential, between a divided voltage equal to 2/N of the first voltage and the first or second reference potential, and so on to, between a divided voltage equal to (N−1)/N of the first voltage and the first or second reference potential, thereby performing the power conversion between the first voltage and the second voltage, wherein N denotes a positive integer greater than two.

5. The multi-phase switching converter as claimed in claim 1, further comprising:
an auxiliary switched capacitor circuit, wherein the auxiliary switched capacitor circuit is coupled to the first sub-switching converter and the second sub-switching converter, wherein the auxiliary switched capacitor circuit includes:
an auxiliary capacitor; and
a plurality of auxiliary switches;
wherein the control circuit is further configured to generate a plurality of auxiliary switching signals to correspondingly control the plurality of auxiliary switches, so as to periodically switch the auxiliary capacitor between a first auxiliary electrical connection state and a second auxiliary electrical connection state, and to thereby perform the switched capacitor switching on the first voltage, so that a bias voltage across the auxiliary capacitor is regulated at an auxiliary divided voltage of the first voltage;
wherein the first auxiliary electrical connection state includes: a series connection of the first capacitor and the second capacitor is connected in parallel with the auxiliary capacitor between an auxiliary switching node inside the auxiliary switched capacitor circuit and the first reference potential; and
wherein the second auxiliary electrical connection state includes: a series connection of the first capacitor and the second capacitor is connected in series with the auxiliary capacitor between the first power node and the second reference potential.

6. The multi-phase switching converter as claimed in claim 1, wherein subsequent to a zero current time point when a zero current detection signal indicates that the first inductor current flowing through the first inductor reaches a zero current, the control circuit is further configured to generate the corresponding switching signals for switching the plurality of first switches or the first subsidiary switch, thereby switching the corresponding electrical connection state.

7. The multi-phase switching converter as claimed in claim 6, wherein subsequent to the zero current time point, after waiting for a dead-time, the control circuit is configured to generate the corresponding switching signal for switching the plurality of first switches, thereby switching the corresponding electrical connection state.

8. The multi-phase switching converter as claimed in claim 6, wherein the plurality of first switches accomplishes a soft switching of a zero-current switching (ZCS) or a soft switching of a zero-voltage switching (ZVS).

9. The multi-phase switching converter as claimed in claim 1, wherein based on the first voltage, the second voltage and a load level, the control circuit is configured to generate the corresponding switching signals for switching the corresponding electrical connection state, so that the first inductor or the second inductor are magnetized within a constant ON time.

10. The multi-phase switching converter as claimed in claim 1, wherein in accordance with a load level, the control circuit is configured to generate the corresponding switching signals for switching the corresponding electrical connection state, and wherein the control circuit is configured to render the plurality of sub-switching converters to operate in a boundary conduction mode (BCM), a continuous conduction mode (CCM) or a discontinuous conduction mode (DCM).

11. The multi-phase switching converter as claimed in claim 1, wherein the first inductor is electromagnetically coupled with the second inductor; wherein, in one condition, the first capacitor and the second capacitor are electrically connected in series between the first voltage and the second reference potential, with the first inductor being coupled between the first switching node and the second voltage, and the second inductor being electrically coupled between the second reference potential and the second voltage, thereby charging the first capacitor and discharging the second capacitor; and in another condition, the first capacitor and the second capacitor are electrically connected in series between the first voltage and the first reference potential, with the second inductor being coupled between the second switching node and the second voltage and the first inductor being electrically coupled between the first reference potential and the second voltage, thereby charging the second capacitor and discharging the first capacitor.

12. The multi-phase switching converter as claimed in claim 1, wherein the switching frequency is based on a resonant frequency, such that the multi-phase switching converter operates in a resonant mode, so as to control a voltage ratio of the second voltage to the first voltage to become correlated with: a ratio of the first divided voltage to the first voltage or a ratio of the second divided voltage to the first voltage, wherein the resonant frequency is based on a first capacitance of the first capacitor and a first inductance of the first inductor, or wherein the resonant frequency is based on a second capacitance of the second capacitor and a second inductance of the second inductor.

13. The multi-phase switching converter as claimed in claim 1, wherein the switching frequency is greater than a resonant frequency such that the multi-phase switching converter operates in a non-resonant mode, and such that the second voltage is regulated at a preset level or the first voltage is regulated at a preset level, wherein the resonant frequency is based on a first capacitance of the first capacitor and a first inductance of the first inductor, or wherein the resonant frequency is based on a second capacitance of the second capacitor and a second inductance of the second inductor.

14. The multi-phase switching converter as claimed in claim 1, wherein the control circuit includes:
a zero current detection circuit, wherein when the first inductor current flowing through the first inductor reaches a zero current, the zero current detection circuit is configured to generate a zero current detection signal for switching the plurality of first switches.

15. A control method of a multi-phase switching converter; the control method comprising following step:
based on a switching frequency, generating a plurality of switching signals, so as to periodically switch a first inductor of a first sub-switching converter in the multi-phase switching converter and a second inductor of a second sub-switching converter in the multi-phase switching converter between a plurality of corresponding electrical connection states, respectively, thus performing a power conversion between a first voltage at a first power node and a second voltage at a second power node;

wherein the first sub-switching converter includes: a first switched capacitor power conversion circuit and the first inductor connected in series to each other, wherein the first switched capacitor power conversion circuit is coupled between the first power node and a first switching node, and the first switched capacitor power conversion circuit includes: a first switch circuit and a first capacitor, wherein the second is coupled between the second power node and the first switching node;

wherein the second sub-switching converter includes: a second switched capacitor power conversion circuit and the second inductor connected in series to each other, wherein the second switched capacitor power conversion circuit is coupled between the first power node and a second switching node, and the second switched capacitor power conversion circuit includes: a second switch circuit and a second capacitor, wherein the second inductor is coupled between the second power node and the second switching node;

wherein the plurality of switching signals are configured to switch the first capacitor and the second capacitor between the plurality of electrical connection states to obtain a first divided voltage and a second divided voltage by dividing the first voltage through switched capacitor switching, so as to switch the first switching node between the first divided voltage and a first reference potential and so as to switch the second switching node between a second divided voltage and a second reference potential a second reference potential, respectively, thereby performing the power conversion between the first power node and the second power node;

wherein the first reference potential is correlated with the first voltage, a divided voltage of the first voltage, a ground potential, a voltage across the first capacitor, or a voltage across the second capacitor, and, the second reference potential is correlated with the first voltage, the divided voltage of the first voltage, the ground potential, the voltage across the first capacitor, or the voltage across the second capacitor;

wherein the first switch circuit has a plurality of first switches and a first subsidiary switch, wherein the first subsidiary switch is coupled between the first capacitor and the first switching node, and the first subsidiary switch is configured to electrically connect the first capacitor and the first inductor in accordance with a corresponding one of the plurality of switching signals;

wherein the second switch circuit has a plurality of second switches and a second subsidiary switch, wherein the second subsidiary switch is coupled between the second capacitor and the second switching node, and the second subsidiary switch is configured to electrically connect the second capacitor and the second inductor in accordance with a corresponding one of plurality of switching signals;

wherein the plurality of sub-switching converters at least includes: the first sub-switching converter and the second sub-switching converter;

wherein the plurality of first switches includes:

a first high-side switch, which is coupled between the first power node and the first capacitor;

a first low-side switch, which is coupled between a third capacitor switching node and the first reference potential, the first capacitor and the first subsidiary switch are jointly coupled to the third capacitor switching node; and a first cross-over switch, which is coupled between a first capacitor switching node and the second switching node, wherein the first high-side switch and the first capacitor are jointly coupled to the first capacitor switching node; and wherein the plurality of second switches includes:

a second high-side switch, which is coupled between the first power node and the second capacitor;

a second low-side switch, which is coupled between a fourth capacitor switching node and the second reference potential, wherein the second capacitor and the second subsidiary switch are jointly coupled to the fourth capacitor switching node; and a second cross-over switch, which is coupled between a second capacitor switching node and the first switching node, wherein the second high-side switch and the second capacitor are jointly coupled to the second capacitor switching node; and wherein subsequent to the first inductor or the second inductor being demagnetized and subsequent to a first inductor current flowing through the first inductor reaching a zero current or a second inductor current flowing through the second inductor reaching a zero current, after waiting for a delay time, switching the plurality of first switches or the plurality of second switches, thereby switching the corresponding electrical connection state.

16. The control method as claimed in claim 15, wherein the first inductor current flowing through the first inductor and the second inductor current flowing through the second inductor are not in-phase and have a non-zero phase difference to each other.

17. The control method as claimed in claim 15, further comprising following step:

in a case where the plurality of sub-switching converters are arranged in a circular sequence, periodically and consecutively switching the first sub-switching converter and second sub-switching converter between the plurality of electrical connection states, so as to switch the first switching node between a divided voltage equal to a half of the first voltage and the first reference potential and so as to switch the second switching node between the divided voltage equal to the half of the first voltage and the second reference potential, thereby performing the power conversion between the first voltage and the second voltage.

18. The control method as claimed in claim 15, wherein in a case where a number of the plurality of sub-switching converters is equal to N, and accordingly, in this case, the control method further comprises following step:

periodically and consecutively switching between the plurality of electrical connection states based on a circular sequence, so as to correspondingly and respectively switch all plurality of switching nodes of all the sub-switching converters between a divided voltage equal to 1/N of the first voltage and the first or second reference potential, between a divided voltage equal to 2/N of the first voltage and the first or second reference potential, and so on to, between a divided voltage equal to (N−1)/N of the first voltage and the first or second reference potential, thereby performing the power conversion between the first voltage and the second voltage, wherein N denotes a positive integer greater than two.

19. The control method as claimed in claim 15, further comprising following step:
generating a plurality of auxiliary switching signals to correspondingly control a plurality of auxiliary switches, so as to periodically switch an auxiliary capacitor between a first auxiliary electrical connection state and a second auxiliary electrical connection state, and to thereby perform the switched capacitor switching on the first voltage, so that a bias voltage across the auxiliary capacitor is regulated at an auxiliary divided voltage of the first voltage;
wherein the first auxiliary electrical connection state includes: a series connection of the first capacitor and the second capacitor is connected in parallel with the auxiliary capacitor between an auxiliary switching node inside the auxiliary switched capacitor circuit and the first reference potential; and
wherein the second auxiliary electrical connection state includes: a series connection of the first capacitor and the second capacitor is connected in series with the auxiliary capacitor between the first power node and the second reference potential.

20. The control method as claimed in claim 15, further comprising following step:
subsequent to a zero current time point when a zero current detection signal indicates that the first inductor current flowing through the first inductor reaches a zero current, generating the corresponding switching signals for switching the plurality of first switches or the first subsidiary switch, thereby switching the corresponding electrical connection state.

21. The control method as claimed in claim 20, further comprising following step:
subsequent to the zero current time point, after waiting for a dead-time, generating the corresponding switching signal for switching the plurality of first switches, thereby switching the corresponding electrical connection state.

22. The control method as claimed in claim 20, wherein the plurality of first switches accomplish a soft switching of a zero-current switching (ZCS) or a soft switching of a zero-voltage switching (ZVS).

23. The control method as claimed in claim 15, wherein based on the first voltage, the second voltage and a load level, generating the corresponding switching signals for switching the corresponding electrical connection state, so that the first inductor or the second inductor are magnetized within a constant ON time.

24. The control method as claimed in claim 15, wherein in accordance with a load level, generating the corresponding switching signals for switching the corresponding electrical connection state, and wherein the control circuit is configured to render the plurality of sub-switching converters to operate in a boundary conduction mode (BCM), a continuous conduction mode (CCM) or a discontinuous conduction mode (DCM).

25. The control method as claimed in claim 15, wherein the first inductor is electromagnetically coupled with the second inductor; wherein, in one condition, the first capacitor and the second capacitor are electrically connected in series between the first voltage and the second reference potential, with the first inductor being coupled between the first switching node and the second voltage, and the second inductor being electrically coupled between the second reference potential and the second voltage, thereby charging the first capacitor and discharging the second capacitor; and in another condition, the first capacitor and the second capacitor are electrically connected in series between the first voltage and the first reference potential, with the second inductor being coupled between the second switching node and the second voltage and the first inductor being electrically coupled between the first reference potential and the second voltage, thereby charging the second capacitor and discharging the first capacitor.

26. The control method as claimed in claim 15, wherein the switching frequency is based on a resonant frequency, such that the multi-phase switching converter operates in a resonant mode, so as to control a voltage ratio of the second voltage to the first voltage to become correlated with: a ratio of the first divided voltage to the first voltage or a ratio of the second divided voltage to the first voltage, wherein the resonant frequency is based on a first capacitance of the first capacitor and a first inductance of the first inductor, or wherein the resonant frequency is based on a second capacitance of the second capacitor and a second inductance of the second inductor.

27. The control method as claimed in claim 15, wherein the switching frequency is greater than a resonant frequency such that the multi-phase switching converter operates in a non-resonant mode, and such that the second voltage is regulated at a preset level or the first voltage is regulated at a preset level, wherein the resonant frequency is based on a first capacitance of the first capacitor and a first inductance of the first inductor, or wherein the resonant frequency is based on a second capacitance of the second capacitor and a second inductance of the second inductor.

28. The control method as claimed in claim 15, further comprising following step:
when the first inductor current flowing through the first inductor reaches a zero current, generating a zero current detection signal for switching the plurality of first switches.

* * * * *